US012641107B1

(12) United States Patent
Chamberlain et al.

(10) Patent No.: US 12,641,107 B1
(45) Date of Patent: May 26, 2026

(54) METHOD AND SYSTEM FOR CYBERSECURITY THREAT DETECTION, VISUALIZATION, AND MANAGEMENT

(71) Applicant: OpenDR LLC, a Delaware Corporation, Lewes, DE (US)

(72) Inventors: Craig Chamberlain, Waltham, MA (US); Anirudh Upadhyayula, Westborough, MA (US); Rewanth Tammana, Dubai (AE)

(73) Assignee: OpenDR LLC, a Delaware Corporation, Lewes, DE (US)

( * ) Notice: Subject to any disclaimer, the term of this patent is extended or adjusted under 35 U.S.C. 154(b) by 0 days.

(21) Appl. No.: 19/177,540

(22) Filed: Apr. 12, 2025

Related U.S. Application Data

(60) Provisional application No. 63/638,751, filed on Apr. 25, 2024.

(51) Int. Cl.
H04L 9/00 (2022.01)
H04L 9/40 (2022.01)

(52) U.S. Cl.
CPC .......... H04L 63/1425 (2013.01); H04L 63/06 (2013.01); H04L 63/1433 (2013.01)

(58) Field of Classification Search
CPC ........................ H04L 63/1425; H04L 63/1433
USPC ......................................................... 726/23
See application file for complete search history.

(56) References Cited

U.S. PATENT DOCUMENTS

| | | | |
|---|---|---|---|
| 6,311,274 | B1 | 10/2001 | Day |
| 7,159,237 | B2 | 1/2007 | Schneler et al. |
| 8,209,759 | B2 | 6/2012 | Newton et al. |
| 9,148,441 | B1 | 9/2015 | Tamersoy et al. |
| 9,699,205 | B2 | 7/2017 | Muddu et al. |
| 9,760,613 | B2 | 9/2017 | Choudhary et al. |
| 10,417,416 | B1 | 9/2019 | Chang et al. |
| 10,841,338 | B1 | 11/2020 | Lin et al. |
| 10,958,667 | B1 | 3/2021 | Maida et al. |
| 11,308,211 | B2 | 4/2022 | Ringlein et al. |
| 11,556,636 | B2 | 1/2023 | Neil et al. |
| 11,658,863 | B1 | 5/2023 | Salinas et al. |
| 12,063,226 | B1 | 8/2024 | Lin et al. |
| 12,081,569 | B2 | 9/2024 | Shahul Hameed et al. |
| 2015/0074806 | A1 | 3/2015 | Roundy et al. |

(Continued)

FOREIGN PATENT DOCUMENTS

EP 4473708 A1 12/2024

*Primary Examiner* — Christopher J Brown

(74) *Attorney, Agent, or Firm* — Stephen E. Zweig

(57) ABSTRACT

A system and method of source and type-independent organization, presentation, and management of security detection artifacts, with heuristic and ML-based (machine learning) prioritization algorithms, providing for unified threat detection management and accurate prioritization without requiring an expert user. This is accomplished using an alternative presentation paradigm underpinned by a combination of heuristics and machine learning. The benefits include greater information gain; improved speed of decisioning cybersecurity detection data; elimination of the split-brain problem where different classes of detection artifacts are stored and managed in different systems; and reduced need for expert users. In cases where machine learning and/or anomaly detections are not available for clustering.

18 Claims, 16 Drawing Sheets

(56) References Cited

U.S. PATENT DOCUMENTS

| | | | |
|---|---|---|---|
| 2017/0063910 A1 | 3/2017 | Muddu et al. | |
| 2019/0132344 A1 | 5/2019 | Lem et al. | |
| 2019/0394225 A1 | 12/2019 | Vajipayajula et al. | |
| 2020/0012796 A1* | 1/2020 | Trepagnier | G06F 18/254 |
| 2020/0296124 A1 | 9/2020 | Pratt et al. | |
| 2021/0099478 A1* | 4/2021 | Seetharamaiah | H04L 63/1433 |
| 2021/0203673 A1* | 7/2021 | dos Santos | H04L 63/1433 |
| 2024/0330480 A1* | 10/2024 | Roytman | G06F 21/31 |
| 2024/0406193 A1 | 12/2024 | Lidgi et al. | |

* cited by examiner

Figure 1 (Prior-art)

| Time ⌄ | rule_name |
|---|---|
| May 8th 2019, 11:57:41.637 | Successful Remote Login - Linux Server |
| May 8th 2019, 11:57:41.520 | AWS Console Login |
| May 8th 2019, 11:57:41.313 | Data Exfiltration - SCP activity |
| May 8th 2019, 11:57:41.136 | Persistence - netcat activity |
| May 8th 2019, 11:57:40.914 | Sudo Activity |
| May 8th 2019, 11:56:41.597 | Successful Remote Login - Linux Server |
| May 8th 2019, 11:56:41.427 | AWS Console Login |
| May 8th 2019, 11:56:41.243 | Data Exfiltration - SCP activity |
| May 8th 2019, 11:56:41.072 | Persistence - netcat activity |
| May 8th 2019, 11:56:40.853 | Sudo Activity |
| May 8th 2019, 11:55:41.481 | Successful Remote Login - Linux Server |
| May 8th 2019, 11:55:41.365 | AWS Console Login |
| May 8th 2019, 11:55:41.192 | Data Exfiltration - SCP activity |
| May 8th 2019, 11:55:40.981 | Persistence - netcat activity |
| May 8th 2019, 11:55:40.803 | Sudo Activity |
| May 8th 2019, 11:54:41.455 | Successful Remote Login - Linux Server |
| May 8th 2019, 11:54:41.329 | AWS Console Login |
| May 8th 2019, 11:54:41.140 | Data Exfiltration - SCP activity |
| May 8th 2019, 11:54:40.953 | Persistence - netcat activity |

Figure 2 (Prior-art)

| rule_name: Descending | Count |
|---|---|
| AWS Console Login | 17,120 |
| Successful Remote Login - Linux Server | 17,090 |
| Sudo Activity | 17,079 |
| Data Exfiltration - SCP activity | 17,073 |
| Persistence - netcat activity | 17,066 |

Figure 3 (Prior-art)

```
                              Alerts

Hostname:        WIN-SERVER01
     Process:         rundll32.exe
     Rule Name:       Anomalous Windows Network Activity
     Rule Type:       machine_learning
     Total Risk Score: 282

Hostname:        WIN-SERVER01
     Process:         rundll32.exe
     Rule Name:       Beaconing Detection
     Rule Type:       query
     Total Risk Score: 47
```

Figure 4 (Prior-art)
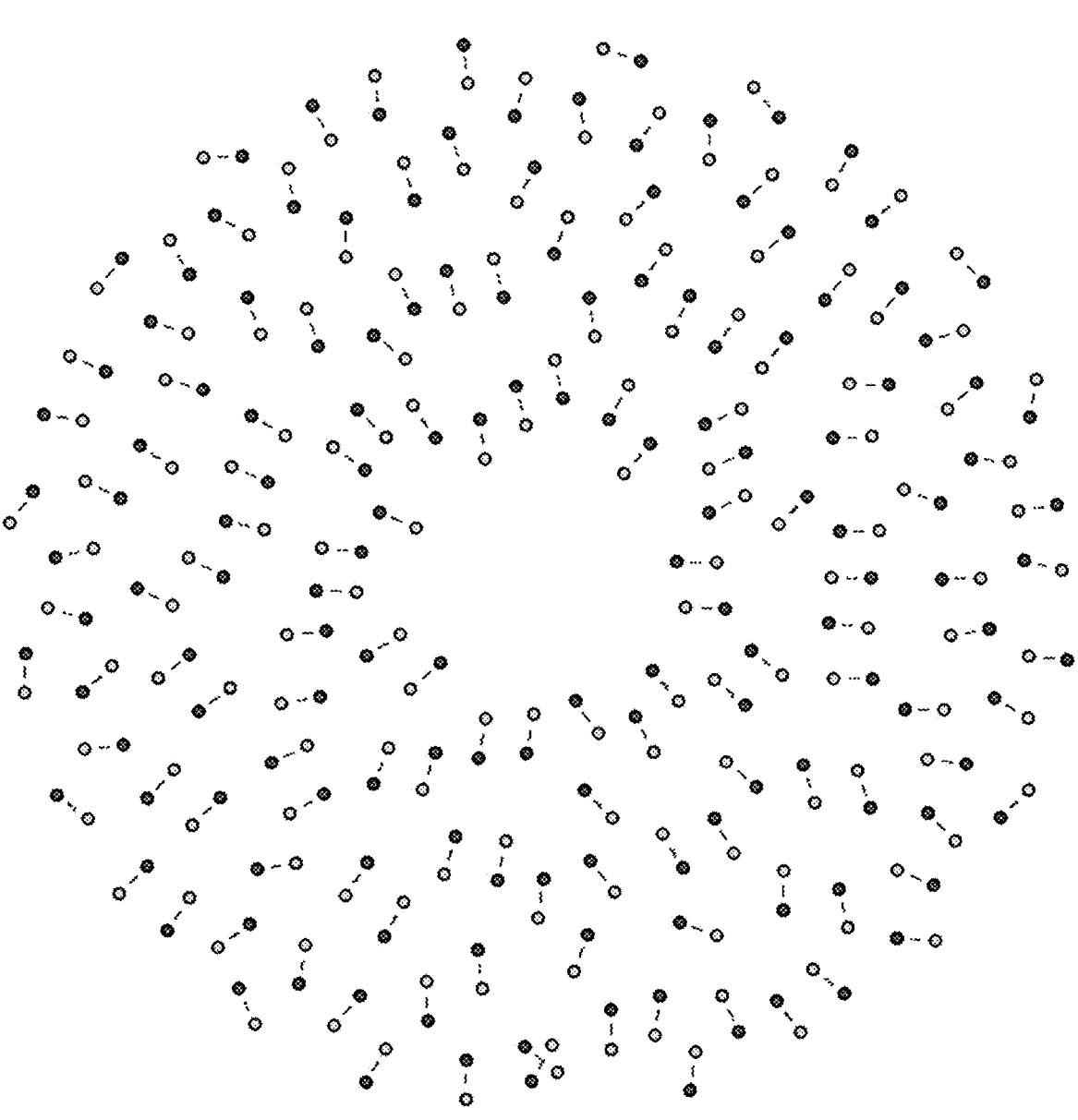

Fig. 5 (Prior-art)
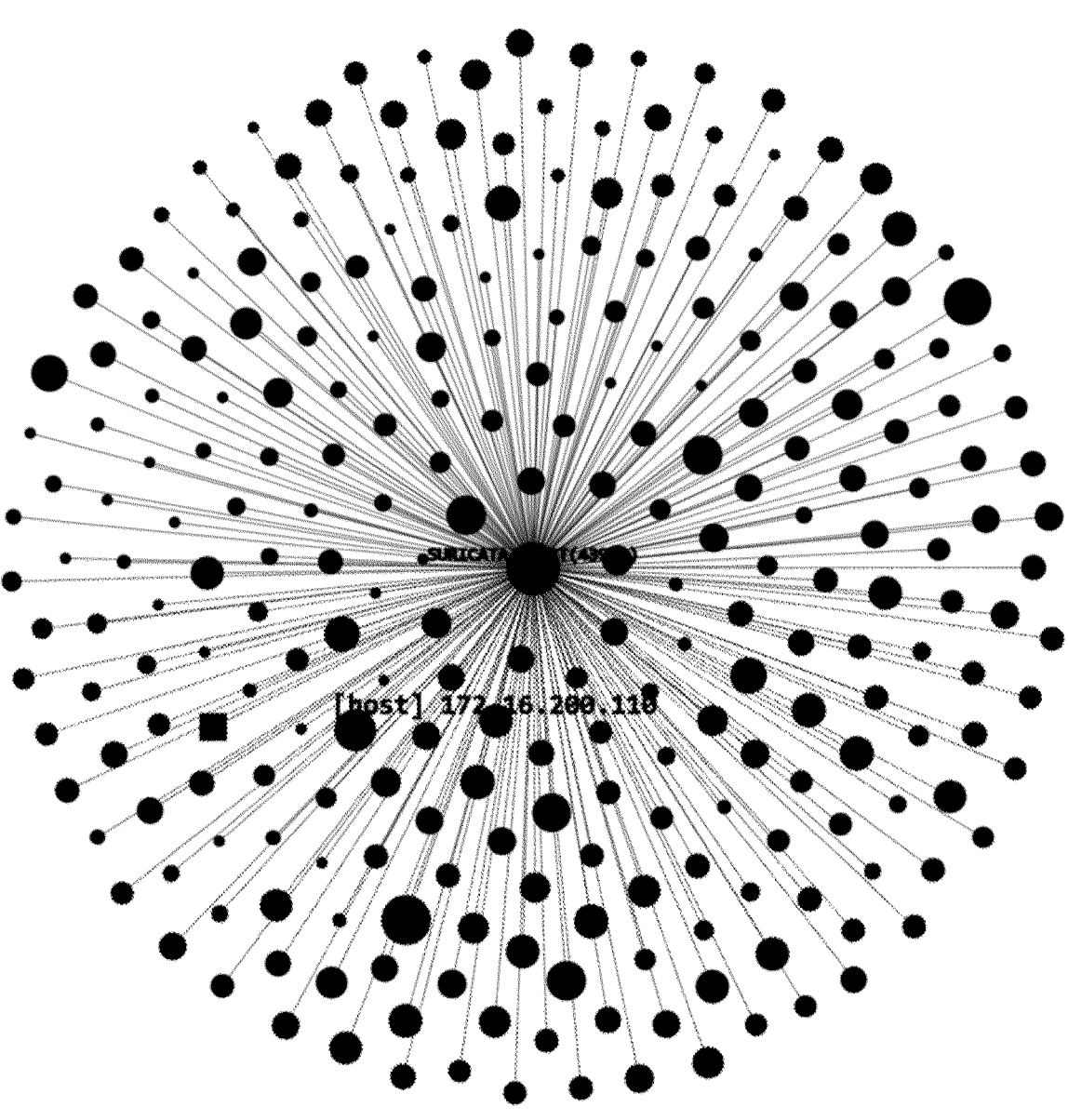

TCP_DEVICE_OBSERVED_IN_HTTP_STREAM(3)

STABLE_ISOTOPE(3)

[host] ATOMIC WEIGHT: 4 - 10.142.0.3

SURICATA_ALERT(2)
SURICATA_APPLAYER_DETECT_PROTOCOL_ONLY_ONE_DIRECTION(2)

NETWORK_ANOMALY(3)

ANOMALOUS_HTTP_REQUEST_METHOD(3)

[host] ATOMIC WEIGHT: 4 -
172.16.4.4

SURICATA_ALERT(1216)

HOT_ISOTOPE(1)

[host] 172.16.1.1

SURICATA_ALERT(66)

ENDPOINT_RISK_THRESHOLD(1)

[endpoint] ATOMIC WEIGHT: 4 - KYLE

ENDPOINT_ALERT(42)

Figure 15

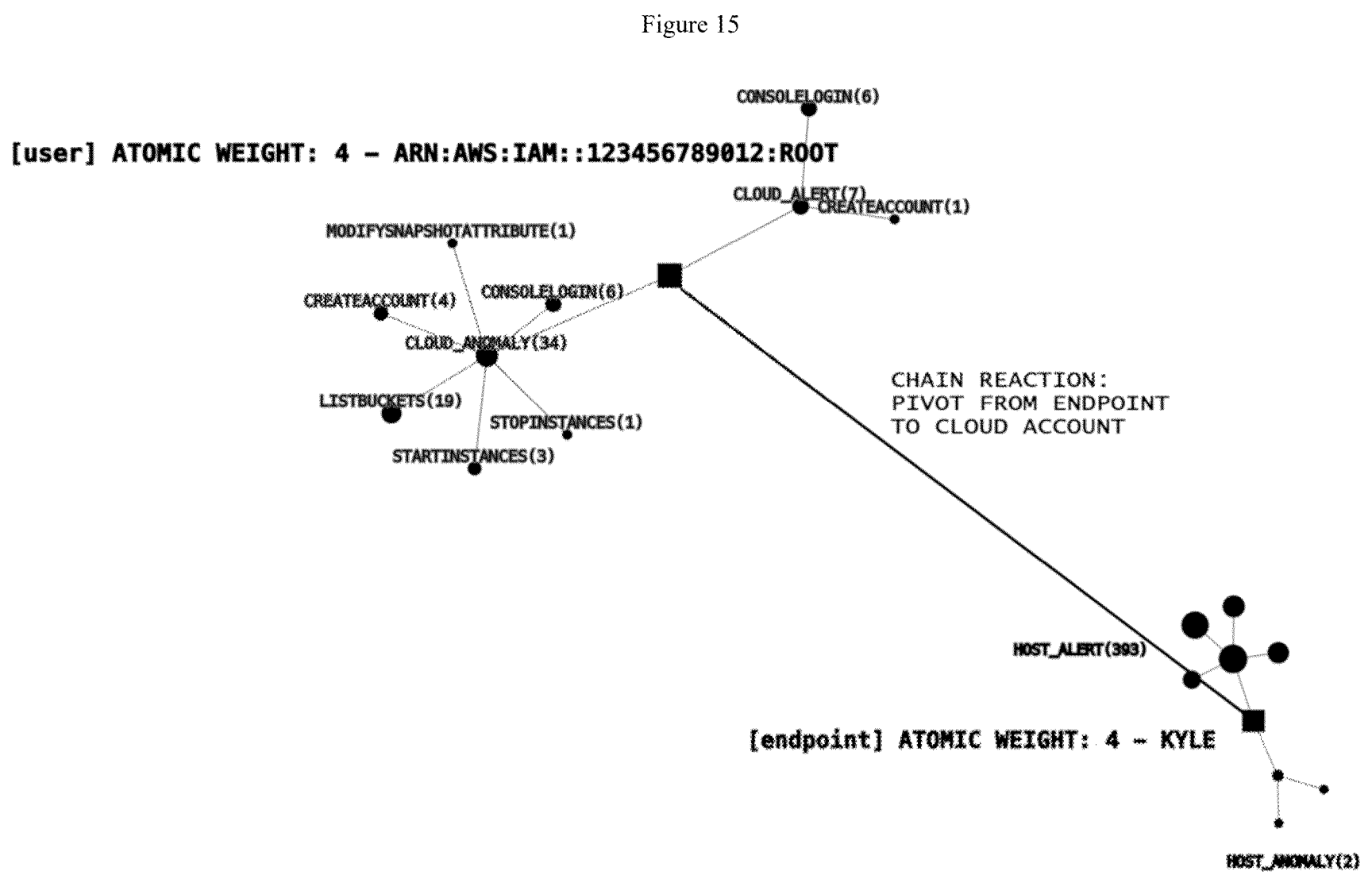

[user] ATOMIC WEIGHT: 4 – ARN:AWS:IAM::123456789012:ROOT

CONSOLELOGIN(6)

CLOUD_ALERT(7)

CREATEACCOUNT(1)

CHAIN REACTION:
PIVOT FROM ENDPOINT
TO CLOUD ACCOUNT

MODIFYSNAPSHOTATTRIBUTE(1)

CONSOLELOGIN(6)

CREATEACCOUNT(4)

CLOUD_ANOMALY(34)

LISTBUCKETS(19)

STOPINSTANCES(1)

STARTINSTANCES(3)

HOST_ALERT(393)

HOST_ANOMALY(2)

[endpoint] ATOMIC WEIGHT: 4 – KYLE

Figure 16

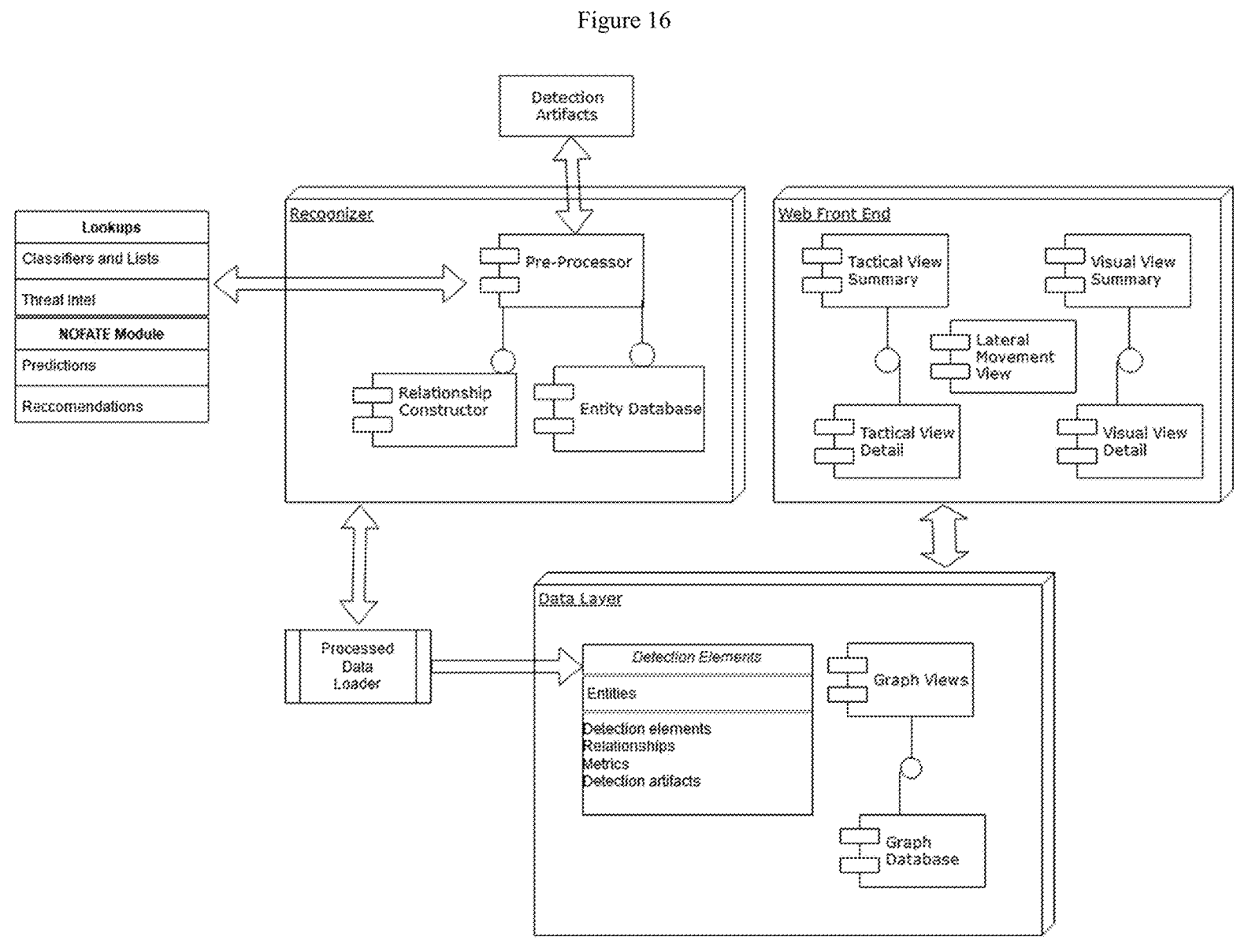

Web Front End

Visual View Summary

Visual View Detail

Lateral Movement View

Tactical View Summary

Tactical View Detail

Detection Artifacts

Recognizer

Pre-Processor

Entity Database

Relationship Constructor

Lookups
Classifiers and Lists
Threat Intel
NORATE Module
Predictions
Recommendations Processed Data Loader Data Layer Graph Views Graph Database Detection Elements
Entities
Detection elements
Relationships
Metrics
Detection artifacts

Element Prediction hot training data
cold training data classification model

Figure 18:
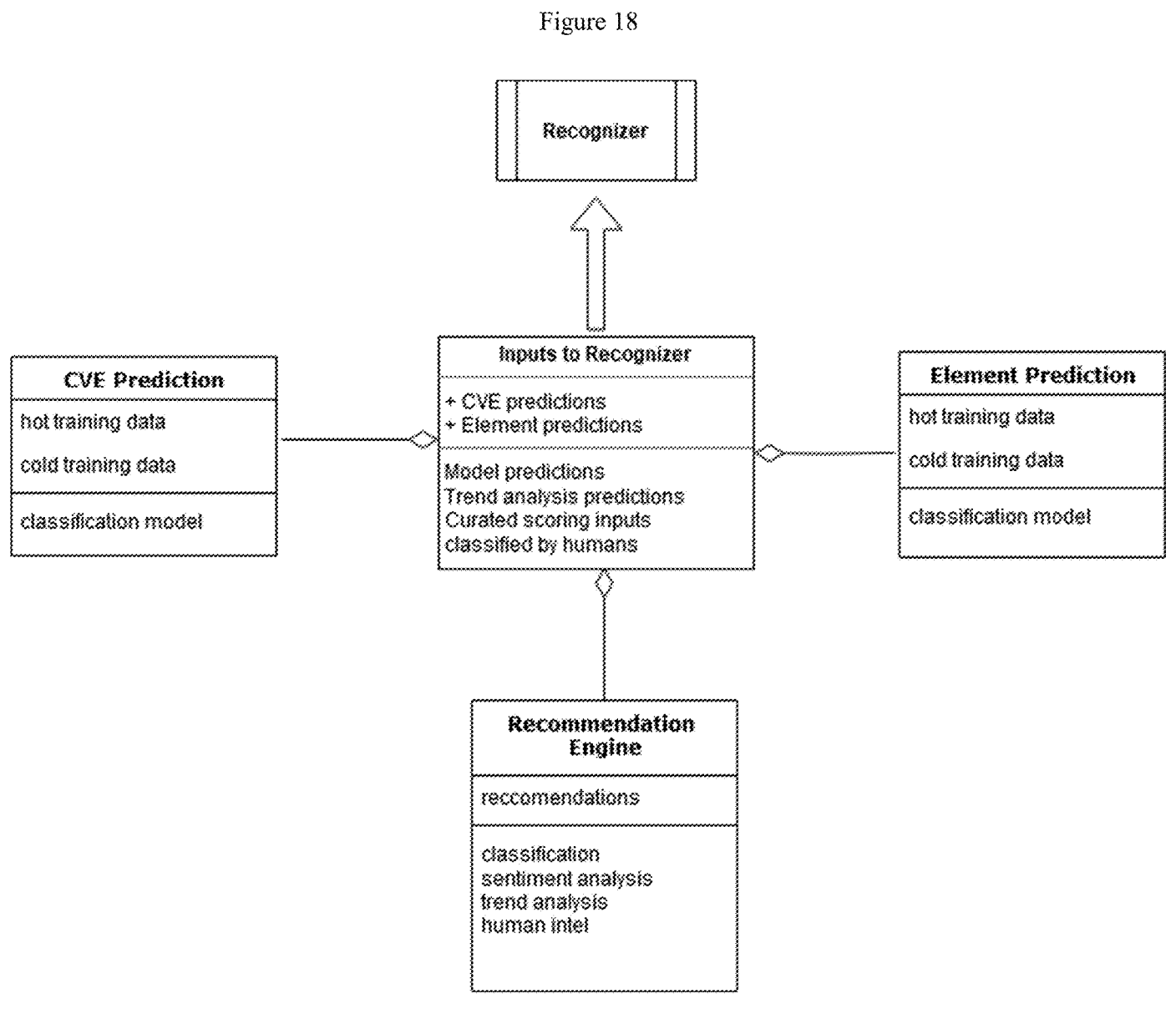

Recognizer

Inputs to Recognizer

+ CVE predictions
+ Element predictions

Model predictions
Trend analysis predictions
Curated scoring inputs
classified by humans

Reccomendation Engine reccomendations classification
sentiment analysis
trend analysis
human intel

CVE Prediction hot training data
cold training data classification model

METHOD AND SYSTEM FOR CYBERSECURITY THREAT DETECTION, VISUALIZATION, AND MANAGEMENT

CROSS-REFERENCE TO RELATED APPLICATIONS

This application claims the priority benefit of U.S. provisional application 63/638,751, filed Apr. 25, 2024, the entire contents of which are incorporated herein by reference.

BACKGROUND OF THE INVENTION

Field of the Invention

The application is in cybersecurity detection, such as security information management, threat detection, and threat hunting.

Description of the Related Art

Prior-art in the field of cybersecurity threat detection, visualization, and management includes U.S. Pat. Nos. 7,159,237; 6,311,274; 9,699,205; and 8,209,759, the entire contents of which are incorporated herein by reference. Other work includes U.S. Pat. Nos. 10,417,416; 10,841,338; 9,760,613; 11,658,863; 12,063,226; 11,556,636; 10,958,667; 12,081,569; 9,148,441, 11,308,211; and US patent publications US2024/0406193; US2019/0132344; US2020/0296124; US2015/0074806; US2017/0063910; and US20190394225; the entire contents of which are also incorporated herein by reference. Other relevant work includes EP4473708A1.

Prior-art work on Kubernetes includes projects like the Falco (Falco.org) cloud security tool and the Github.com Kubernetes cluster auditing software project Kubeaudit (github.com/Shopify/Kubeaudit).

Prior-art on Network Security Monitoring (NSM) includes the network security monitoring projects Suricata (suricata.io) and Zeek (zeek.org).

Prior-art on cybersecurity attack information includes the ATT&CK knowledge base, a knowledge base and schema for labeling and describing patterns of attacks, provided by attack.mitre.org Prior-art work on SIEM (Security Information and Event Management), EDR (Endpoint Detection and Response) and/or IDS (Intrusion Detection System) tools includes the open-source security platform Wazuh (wazuh.com), the open-source enterprise security platform Security Onion (available at securityonionsolutions.com), and the security information and event management platform SIEMonster, available at siemonster.com.

Prior-art work on machine learning methods useful for cybersecurity includes Large Language Models, including projects like LogGPT, AutoSecGPT and GhidrAssist; and other machine learning systems including TensorFlow®, LangChain, and projects such as Kitsune-py, PyIDS, LogAnomaly and DeepLog.

BRIEF SUMMARY OF THE INVENTION

This summary provides a brief introduction to several example embodiments of the disclosure. It is offered for the reader's convenience to aid in understanding, but it does not capture the full scope or breadth of the disclosure. This is not intended to be a comprehensive overview, nor does it identify all key features or limitations of the embodiments described. Rather, it presents selected concepts in a simplified manner, serving as a prelude to the more detailed description that follows. For ease of reference, the terms "some embodiments" or "certain embodiments" may refer to one or more embodiments of the disclosure.

The problem statement, concerning the conjoined problems of alert fatigue and poor signal-to-noise levels, in cybersecurity threat detection, can be summarized thusly:

1. As alerts and detection artifacts increase in volume and variety, the time and effort cost required to decision them—with or without AI (yes we use AI)—increases in a way that may be logarithmic or exponential but is usually not linear. A method is needed that is more asymptotically optimal so the cost curve is relatively flat and non-linear as volume increases.

2. As volume increases, and new detection types proliferate into the mix, the ratio of noise to signal generally gets worse. A method is needed that gets better with scale—where signal increases with density and noise decreases.

3. An alert rule cannot be simultaneously optimized for sensitivity and specificity—false positives and false negatives—at the same time. Consequently, a different approach is needed.

The present invention is inspired, in part, by the following insights:

Management of cybersecurity threat detections has become unwieldy for many organizations due to a number of factors.

So-called "alerts" or specification-based detections are shipped by the thousands, often with little testing or attention to quality, resulting in vast floods of false positives and "noise" alerts—incidental findings that are not false positives but are not actionable or in need of investigation.

At the same time, specification-based alerts have failed to keep pace with the evolution of emerging threats, resulting in critical false negatives—missed detections—that may carry a business cost greater than the first problem of false positives and noise alerts.

As a result, new detection types, including anomaly detections and machine learning detections, have been brought to market without sufficient research and development, which creates even more confusion and alert volume.

As the number and quantity of detection technologies, and the associated alerts they output, has increased by orders of magnitude, to levels where the size of the alert queues are of such size that review by humans is mathematically infeasible, often resulting in only a subset of alerts rated "critical" being given attention, and threat activity being missed.

The confluence of these events has given rise to a problem called "alert fatigue" where human users are overwhelmed with volumes of alerts that exceed what they can consume.

Even if the human users—or possibly emerging AI technologies—could process vast numbers, we have long since reached the limits of what signal vs. noise can be achieved at the level of the individual alert and associated alert rule. As alert rule developers "tune" or optimize for decreased false positives, false negatives increase. Optimize for false negatives again and false positives return. Consensus is widespread that we cannot solve the problem of signal to-noise at the level of the alert rule and we need new paradigms that function where alerts are dense without these associated paradoxes.

During the second decade of the 21st century, a paradigm shift occurred from network security monitoring (NSM) to endpoint detection and response (EDR) tooling, standards, and practices. This migration left behind large populations of so-called network "appliances" and devices whose manufacturers are, for various reasons, unwilling or unable to support EDR agents and/or tooling. This creates significant blind spots on enterprise networks for threat actors to persist without detection.

NSM event telemetry and associated alerts are a widely available technology but they require extensive network protocol knowledge and consequently have never enjoyed widespread user or customer success, another factor that contributed to the EDR paradigm shift. NSM, and intrusion detection system (IDS) data is unrevealing in detecting many modern endpoint payloads and tactics. It is largely irrelevant in cases involving credentialed access to cloud systems and to bring-your-own-device (BYOD) or work from home scenarios. NSM and IDS data is used extensively in existing academic work on applying machine learning and/or AI technologies to threat detection and prioritization but the inherent limitations of using this data type by itself makes such approaches unproductive.

While unrevealing to many endpoint and cloud-based threat models, NSM data is highly relevant as a source for detections involving 1) so-called network "appliances" and devices whose manufacturers are, for various reasons, unwilling or unable to support EDR agents and/or tooling and 2) so-called "agentless" compute environments where EDR technologies are not used for reasons of cost or practicality when cloud compute workload fleets are highly dynamic and/or ephemeral.

NSM alerts have unique challenges. In many cases, the question of whether a given exploit (attack) succeeded is undecidable from consideration of the alert by itself—the fact that a shot was taken on goal, in a game of sports, is not enough to decide whether it was a score or a miss. Many NSM alerts also have a significant half-life, which is not considered effectively in the setting of low, medium and high severity labels which are largely static. For example, in the winter of 2022, the Log4j vulnerability, and associated exploits, were of critical priority, carrying critical business risk of intrusion and compromise, when they manifested. In 2025, three years later, these alerts are of relatively low or no priority because this vulnerability has been remediated in most information systems of value. The alerts, and the alert managers, however, do not consider this. In fairness, this is something of an undecidable problem for the IDS alert writer who cannot possibly know what conditions will exist on the networks where the alert fires.

While certain SIEM (security information and event management systems) are capable of processing both NSM (network security monitoring) and host (EDR) telemetry and detection data, none excel at the integrated consideration and presentation of both, resulting in the "split-brain" problem where analysts use different tools to manage these detection types and undertake slow and manual correlation between them.

Alert managers and alert presentation design paradigms date back to the late 20th century. Alerts are presented in table format, which has numerous limitations. Differences in fields between host and network detections makes it difficult to present both in a table format that is both intuitive and visually appealing. Worse, many alert managers organize alerts as line items in enormous tables which may take hours for analysts to process one by one.

The rise of cloud services has introduced new event log telemetry and associated alert types containing a third set of entities and associated detection artifacts that have no overlap with host and network events. This proliferation and evolution of these detection artifacts have made table-based presentation, and correlation attempts ineffective.

Another negative effect of the simple alert table is that critical relationships between detection artifacts are not visible to the users and analysts unless they perform their own manual clustering, which is time-consuming and requires extensive skill and knowledge, placing it beyond the reach of many organizations. Relationships between detections, and detection types, that provide corroboration, and increase true positive confidence, are ignored. The confluence of these limitations of traditional alert tables exacerbates the problem of alert fatigue, slows security alert triage, and reduces accuracy by failing to surface critical clusters, patterns, and relationships.

Workflows organized around single alerts do not align with real-world incident response standards and practices. Incident response typically involves investigating an asset such as a host, a device, a unit of compute workload, or a user context. The goal of the investigation is to determine the extent and nature of what, if any, compromise the asset has experienced. Practitioners investigate and clear assets, not individual alerts.

The application of machine learning to the prioritization of alerts themselves has not solved the problem of alert fatigue. Models trained on existing alert sets labeled with either binary or categorical labels may mis-label new attack detections that resemble nothing in the training data. Assembling a complete set of training data is problematic because for any given organization, available data contains of subset of the threat activity that exists and not the entire set. Assembling a complete set is theoretically possible, at great cost, using a sophisticated array of ranges, but this would need to be an ongoing project indefinitely as new exploits, tactics and techniques emerge and evolve. Emerging threats which are not yet detected, and appear in no training data, may be of higher criticality than known threat activity due to its ability to maximize "dwell time" while it goes undetected. Similarity clustering of alerts is useful for grouping and categorization more than prioritization. A set of dissimilar alerts, from different detection stacks, can be more critical than a set of similar alerts. Critical threat detections have been made for state-sponsored malware through combinations of conventional and machine learning detections, and heuristic behavioral detections for behavior like beaconing, that are quite dissimilar, but successfully surface emerging activity with supercritical impact.

For similar reasons the practice of "enrichment" has limits when prioritizing alerts. Alerts that came from process events, for example, have different fields than network events, which limits the available fields and field values to use as lookups for additional metadata injection. The practice of plotting alert relationships has more information gain than alert enrichment.

This disclosure teaches an alternative method of presentation and management of alert and detection data, enabling users to quickly ascertain the importance and significance of their detection sets. In some embodiments, the invention may also use a pictorial display (e.g., a graphical output) as an alternative to table or textual displays of detections. Detections are first grouped and clustered using a join algorithm, which constructs entities using the following fields, allowing for intuitive plotting and displaying all types of detection events and data. The scoring mechanisms, associated views, and cluster plots allow a user to quickly discern which, if any, clusters are more important than the others and which are the highest priority for attention. This paradigm allows for sub-minute triage of very large numbers of alerts. Decisioning a comparable large set of alerts in a table-based view, where each alert is a row, may take several hours or even days if alerts are supernumerary. The recommendation engine, in addition to providing high-quality decision support, further reduces the need for each organization to maintain expert users to interpret, triage, and decision cybersecurity detection data. Organizations that lack experts are informed of the opinions of the expert users in the form of recommendations about which detections and clusters are most actionable.

BRIEF DESCRIPTION OF THE DRAWINGS

FIG. 1 shows an example of a prior-art single-alert cybersecurity threat presentation.

FIG. 2 shows an example of a prior-art text and table-based summary view of alerts.

FIG. 3 shows a detailed view of a simple (prior-art) alert set. This shows how prior-art alerts are typically presented as rows in a table with hostnames, alert names, and some alert metadata.

FIG. 4 shows an example of a typical prior-art unorganized graph display with no information gain.

FIG. 5 shows an example of a typical prior-art simple alert graph display with no information gain.

FIG. 15 shows a critical relationship, a chain reaction between two detection elements across two different entity types in different environments. The invention is advantageous because it can quickly visualize intrusion relationships across different entity types.

FIG. 16 shows a high-level system diagram of the invention.

FIG. 17A shows a high-level view of the logic and data flow of the invention's "recognizer" module, which creates constructs such as entities and relationships that are used to form detection elements.

FIG. 18 shows a high-level system diagram of the invention's "Nofate" machine learning module.

DETAILED DESCRIPTION OF THE INVENTION

Figure 6:
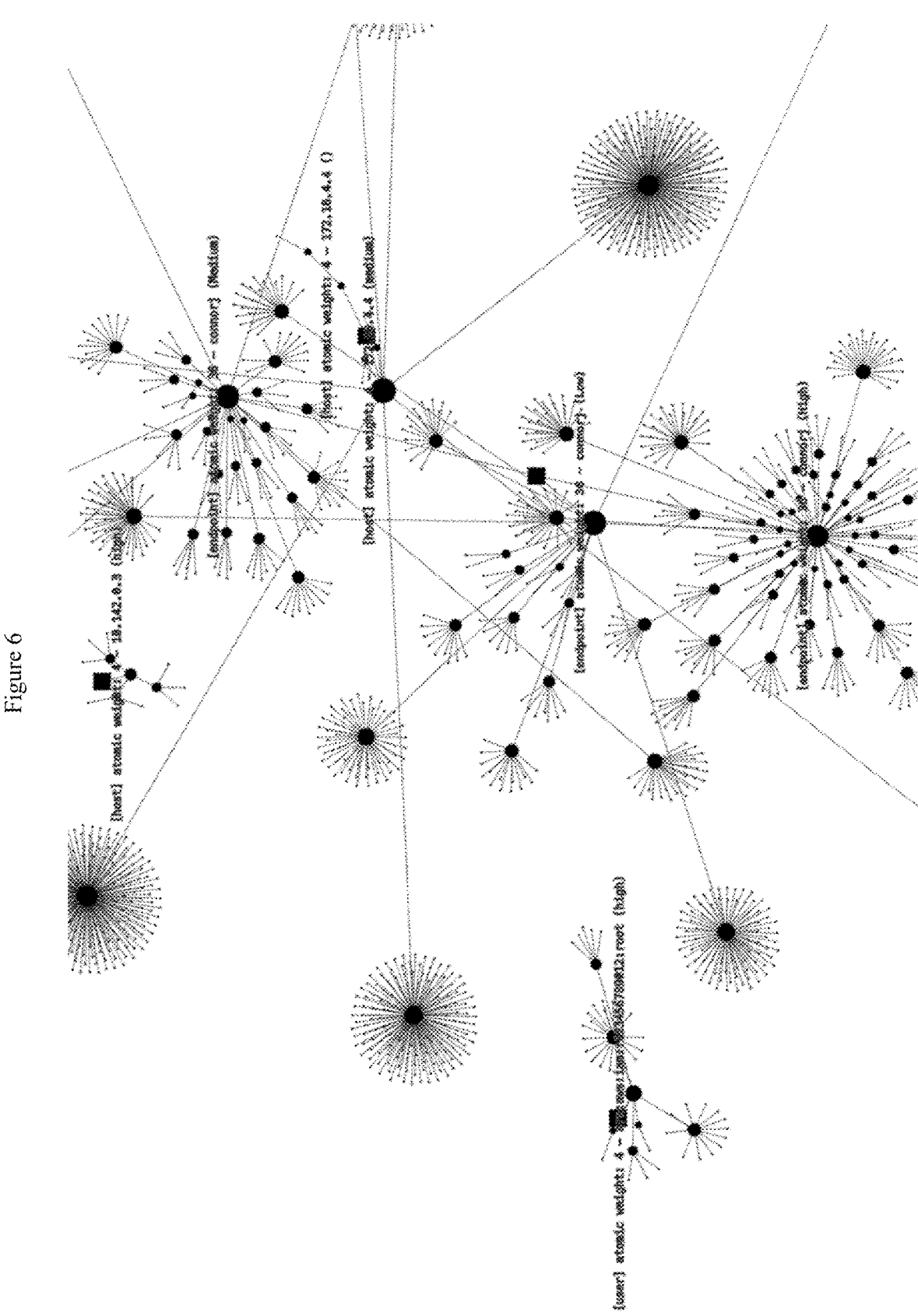
FIG. 6 shows how alerts and detection artifacts can be better displayed according to the invention.

Definitions atomic mass: a number indicating the total number of detection artifacts in the detection element. This can also be termed the total number of detection artifacts.

atomic weight: a ranked metric indicating the relative priority, and confidence of the importance of the detection element. This can also be termed the detection element's weight, or its relative priority.

alert: a threat detection artifact produced by a third-party product or tool, usually when a rule evaluates true on a set of one or more events.

anomaly detection: a threat detection artifact created by an anomaly detection or machine learning engine, rather than a static rule.

case: a unit of work, comprising an investigation with an assigned owner, and often consisting of sets of alerts and detection artifacts, centered around an entity such as a host or user.

CVE: common vulnerabilities and exposures. This can be a list of known software and hardware vulnerabilities.

detection artifact: a single threat detection of any kind produced by one of; a conventional search or query-based detection mechanism; a machine learning detection mechanism; an AI or LLM generated detection; an anomaly detection mechanism; a heuristic detection mechanism; a specification-based detection mechanism; or any other detection artifact that can be ingested.

detection element: a set of detection relationship artifacts, with higher true positive potential, that naturally cluster connected to around an entity such as an endpoint, host or user.

detection relationship: a summary node connected to an entity consisting of a detection type and a counter of the number of alerts matching the relationship. Some of these are categories of detection artifacts that have been ingested and some are relationships unique to the Skynet project that are used in prioritization and calculation of atomic weight.

entity: the central node of a detection element, to which the detection relationships are connected. Entities may be one of the following:

endpoint: a compute workload instrumented and generating EDR-like detection relationships.

event: an original log message or other telemetry message host: a network device lacking EDR-like events and alerts but which may be the subject of NSM-like detection relationships.

isotope: a detection relationship that indicates the presence of a detection artifact that has been given dynamic prioritization by a recognizer module (described in more detail in FIG. 17). This can also be termed a dynamically prioritized detection artifact. Isotopes are necessary to create detection relationships and atomic weights in cases where detection artifacts diversity are sparse, producing few or no relationships, but may contain a small number of artifacts that contain a high signal that needs to be up scored.

isotope, hot: a single named detection artifact, with one of these characteristics: 1) a detection artifact that is related to a particular CVE (common vulnerabilities and exposures), that has been given priority consideration because its presence on a 'hot' list or watchlist indicates it has been observed being widely exploited and causing harm. 2) a detection artifact that is related to a CVE that has been predicted to go 'hot' in the future and become watchlisted. This second class of isotope is created by the Nofate machine learning module.

Isotope, warm: a detection artifact that is currently trending because, while not watchlisted for importance, it is relatively new and widely unpatched or unmitigated. The priority of this class will tend to decay with time until it becomes a cold isotope.

isotope, cold: a single named detection artifact, often related to a particular CVE, that is not given priority consideration. An isotope may also be rated cold from its inception when it is predicted to have little or no impact potential by any combination of the Nofate machine learning module, inputs from recommendation engines, and heuristics or lists coded by human experts.

isotope, stable: a single named detection artifact, not related to a particular CVE, that has been given a higher priority because the artifact is an invariant which reliably and generically detects a tactic or technique independent of specific local conditions such as a CVE or and whose priority will not decay with time (often because of continued evidence that the detection artifact causes problems) until or unless it is downgraded because it is no longer of high relevance. pod: a Kubernetes pod in a cluster which is the subject of detection relationships generated from Kubernetes logs. Kubernetes is an open-source platform for automating deployment, scaling, and management of containerized application, and a Kubernetes cluster is a group of nodes that work together to run containerized applications in a coordinated way. A cluster consists of containers, worker nodes, and a control plane.

user: a user context. Users can be local to an endpoint or host; can be attached to a Kubernetes cluster; or can be completely detached from compute workloads and existing as users in cloud service environments.

recognizer: the module that pre-processes detection artifacts and creates entities, detection relationships, and isotopes, for use in the knowledge graph.

In some embodiments, the invention may be a system or method of analyzing, and optionally graphically displaying, clusters of threat detection elements. Expressing the invention in methods format, this method can comprise using at least one processor to create entity-based elements of threat detection artifacts from any of host, network, Kubernetes or cloud API log data, or other sources, and forming elements of these threat detection artifacts by using at least one join algorithm to join these threat detection artifacts according to relevant entities present in the data and scoring them based on the relationships in the element.

A detection element is formed around an entity, using one or more join keys consisting of common field values that can be related across unrelated detection artifacts from different tools and pipelines. The entity is the nucleus, at the center (or heart) of the detection relationships, which are the number and type of detection artifacts that have been identified as involving the entity. Detection relationships include, but are not limited to, any of the detection types enumerated in the description of FIG. 17. The use of entity constructs using multiple attributes allows for the combination of disparate detection elements that would not normally be related via a conventional join because they do not have fields in common. This allows for construction of detection elements with the greatest possible density, corroboration, confidence and signal strength.

When threat detection artifacts are obtained from endpoint data, the invention can handle them as endpoint telemetry-sourced type artifacts using a primary join key which is an endpoint entity comprising a host Global Unique Identifier (GUID), when available, and at least one secondary join key(s) comprising a hostname and identified IP address.

When threat detection artifacts are obtained from network data, and no endpoint entity can be determined, the invention will treat these threat detection artifacts as comprising a primary key which is a host entity, comprising a device IP address and a secondary join key comprising a DNS name when available.

When the threat detection artifacts involve a Kubernetes cluster, the invention will treat them by using a primary join key as a pod entity comprising a pod identifier, either parsed from the artifacts or derived and assigned using a lookup table.

When threat detection artifacts are obtained from cloud API log data, the invention will treat these threat detection artifacts as a user entity comprising a primary key comprising a unique user context.

These entities are created during pre-processing by the recognizer module (see FIG. 17) which ingests raw detection artifacts, from supported sources, and transforms them into detection relationships with entity and relationship names. The recognizer normalizes pre-existing fields such as detection name, timestamp, tactics, and important process and network fields that are present. The recognizer creates and populates the source, detection-type, entity, and entity-type fields. The entity and entity-type fields are created according to the logic above. The detection-type field is populated according to a lookup table and the source field is populated according to which pre-processor processed the detection artifact. The recognizer will add additional records to the detection element such as isotopes and signal corroboration. Signal corroboration relationships indicate the presence of corroboration between different classes of detection artifacts, detection artifacts from disparate data sources, or certain combinations of complementary detection artifacts that drive high signal confidence.

Using Intrusion Prediction as a Scoring Metric:

In some embodiments, the invention may also use intrusion prediction as a scoring metric. These predictions are produced by the 'nofate' machine learning model component. Predictions are used to identify hot isotopes that have not yet been watchlisted by human experts but will be in the near future. This contributes to signal processing by creating hot isotope detection relationships with the added benefit of threat and intrusion set prediction. With early warning times that may be up to 30 or 60 days, it may be possible to engage in risk avoidance by remediating the CVE in question rather than engaging in incident detection and response, which have significant costs. In the event rapid remediation is not possible or practical, due to local constraints on system changes and maintenance, the hot isotope relationships formed using predictions will provide faster detection of exploitation cycles involving hot CVEs than conventional means. In cases where rapid detection results in incident containment, rather than incident response, the business benefits are again valuable.

Predictions are generated by the 'nofate' machine learning model which is a binary classification model implemented in TensorFlow. The model uses three data sets for training:

hottn: a DataFrame containing hot pre-2024 CVEs that are watchlisted, labeled hot because they have experienced widespread exploitation, being used and/or preferred by threat actors, and caused the most harm.

coldtn: a DataFrame containing CVEs that are not watch-listed, and have been hand selected and assembled because they are the least significant CVEs in the record, which have had little or no impact, and labeled cold.

hottt: a DataFrame containing 2024 CVEs for testing the accuracy of the classifier.

The DataFrames use certain fields as features, including but not limited to description, product and vendor name, and CWE metadata. They are assembled to ensure there is no overlap between the training and test data. These fields are combined, tokenized and vectorized into an array. The vectorized data is processed in a TensorFlow model with at least three layers; 1. A dense layer with 128 neurons using the Rectified Linear Unit (ReLu or relu) activation function 2. A dense layer with 128 layers using relu as the activation function 3. A dense layer with one neuron using the sigmoid activation function. The model currently has 236,609 trainable parameters. During training it reaches validation accuracy of 0.9915 and validation loss of 0.0301. The trained model is used to classify new CVEs as hot or cold for prediction purposes and has made 24 provably correct (published in advance) predictions at the time of this writing during the first ten weeks of calendar 2025.

In these embodiment, four types of isotope (dynamically prioritized detection artifact) relationships exist-hot (high impact detection artifacts linked to specific conditions and subject to priority decay), cold (low impact detection arti-facts), warm (artifacts that are potentially relevant, because they are recent, but have not been rated hot and stable (persistent detection artifacts that are not subject to decay). Hot and cold isotopes are used to indicate dynamic priorities of detection artifacts using several classes of inputs as defined above. The use of machine learning models has certain advantages, as it allows for earlier warning by using intrusion prediction methods. For example, this can be done by using a carefully curated set of training data, ideally developed after extensive experimentation. The machine-learning model can be directed to output CVE records with 'hot' (high impact potential) and 'cold' (low impact potential labels.) A label of 'hot' indicates a higher probability that a given CVE record will eventually be added to important watchlists, such as the KEV (Known Exploited Vulnerabili-ties Catalog), at least after experiencing further significant exploitation and impact.

Because these predictions can be made at the time of CVE creation, these predictions can predate more authoritative watch listings, such as KEV listings, by 32 days or more. This creates an improved system that can result in significant business risk reduction through early warning via intrusion prediction where CVE data is available in detection artifact data or can be derived from software version and patch data. Cold isotopes reflect classes of detection artifacts that have low signal priority, either inherently or because they have experienced time-based decay of their signal 'half-life' which is continuously updated in a data dictionary. Most hot and warm isotopes will eventually be downgraded to cold isotopes. This Using a time-based decay or derating algo-rithm provides for stronger signal strength (e.g. better threat-signal/background noise level) and improved threat priori-tization over prior-art cybersecurity metrics like "severity," which are static and generally assigned assuming time-neutral conditions.

Stable isotopes are detection artifacts, not related to a particular CVE, that has been given a higher priority because the artifact is an invariant which reliably and generically detects a tactic or technique independent of specific local conditions such as a CVE or and whose priority will not decay with time (often because of continued evidence that the detection artifact causes problems) until or unless it is downgraded because it is no longer of high relevance.

In a preferred embodiment, the invention scores these various detection elements according to the signal strength of the relationships. For example, in some embodiments, two scores are computed: the atomic mass (total number of detection artifacts) and the atomic weight (the detection element's signal confidence and threat priority). The inven-tion will then stack rank these scored elements according to the priority of signal strength and confidence. Finally, the invention will use at least one computer processor to graphi-cally display these scored elements, with their secondary join keys spatially distributed around their primary join keys.

The use of isotopes is important because up to one-third of intrusion sets and associated detection artifacts, such as intrusion detection alerts, may be sparse and incapable of forming detection relationships by themselves. So-called network appliances, and many network devices, for example, generally cannot be instrumented for rich telem-etry using tooling such as an EDR (endpoint detection and response) tool. In addition, so-called "agentless" environ-ments may also lack rich telemetry and present sparse data. The signal to noise ration of these detection artifacts is very low but there will be some among of critical signal to be identified and raised for attention, The use of isotopes provides for creation of detection elements with of high-confidence signal where only such sparse data exists, or in some cases, where only sparse data types provide a primary detection that is intermixed with a vast amount of noise.

Output

FIGS. 1-2 show how alerts are typically presented (ac-cording to the prior-art) as rows in a table with metadata such as a timestamp, alert name, and other metadata. To consider the size and composure of these kinds of alert sets, from rows in a table, the human analyst has to either draw a diagram or try to visualize it through cognition, as some experienced analysts learn to do. However, this is a slow and manual process and is prone to errors when humans try to manually correlate and visualize relationships between large sets of alerts and detections of various types. The volume and frequency of alerts, in modern tooling, may create lists and tables of alerts at such scale that they become math-ematically infeasible for human consumption, even when there is some signal intermixed with noise alerts.

FIG. 2 shows another form of prior-art that generates a simple aggregation of alerts by name. In some ways, this is more usable than the single alert view in that a human can read it in a matter of minutes vs. hours. This form has low information gain (e.g. is relatively slow and hard to read, difficult to distinguish important events from background noise) because alert counts in the aggregate are unrevealing in making triage decisions about the host or user entities they involve.

In many implementations, so-called "circuit breakers" are often used in a simplistic attempt to address user complaints about noise, alert fatigue, and/or false positives. Prior-art circuit breakers typically disable a rule from outputting alerts, once a prescribed quantity has been generated within a time window. Prior-art circuit breaker implementations vary widely and may be as aggressive as one thousand alerts per rule, per day, or one hundred alerts, per rule, per 5-10-minute interval. While such prior-art circuit breakers create the illusion that they have solved the problem of alert fatigue, they are often inadequate. This is because such prior-art circuit breakers also introduce opportunities for evasion that can and are exploited by both "red team" security testers and threat actors. With such prior-art circuit breakers in place, a very modest-sized data injection is sufficient to continuously trip the prior-art circuit breakers and ensure the rules only output a stream of junk alerts while generating no accurate positive detections on actual threat activity.

In the detailed view shown in FIG. 3, the prior-art method shows some information about the detections associated with a single host. However, several limitations exist here as well. First, this detailed view cannot be utilized to quickly triage, decide, and prioritize detections, as it requires viewing a detail page for each host or user and associated reading time, which would take minutes or hours compared to the sub-minute decision-making process enabled according to the invention. This is because host and user entities are often presented on different summary and detail pages, requiring users to view and manually amalgamate the different pages in order to produce a prioritized triage list of detections and cases.

Another problem with such prior-art type presentations is that they often use one-dimensional entities, such as hostnames, usernames, or IP addresses, which precludes assembling sets of detections from disparate detection pipelines that do not share common fields, such as endpoint, cloud and network data. This often limits or prevents these prior-art presentations from effectively plotting or considering corroborative relationships between different detection elements when calculating risk scores or signal confidence.

In some implementations, events and alerts are joined by process names and identifiers on an endpoint in an attempt to identify the signal. This technique often fails to consider corroborative events that do not share the same process tree and is often unable to include corroborative events from different primary data sources. The confinement of relationships to process trees excludes corroborative relationships from signal computation that do not share the same process tree excludes sets where more than one process or event type is involved in a kill chain or intrusion set, which often occurs. In many implementations, these sets of events are also limited to a fixed time window—often ranging between 9 and 17 minutes—that is convenient or performant for the platform where the detection stack is running. These time sequence rules make detections fragile and creates evasion conditions where the adversary need only introduce sleep periods between steps to prevent the sequence evaluating true by exceeding the time window, for example, lengthening the cycle to 11 or 19 minutes so that the time sequence expires and results in a false negative.

FIGS. 4 and 5 and 6 show examples of a typical (prior art) unorganized graph alert display with no information gain. FIG. 4 shows an example of a (prior art) graph of detections with no information gain. The problem with this approach is that the detection artifacts—alerts in this case—are clustered around a source or destination IP address of an Internet-facing host. This kind of simplistic alert plot is unfavorable to a graph display or the identification of signal among noise. The use of a single entity attribute-source or destination IP address, with network alerts, or a hostname, with endpoint alerts, does not allow for entity-based sets composed of different primary data types, which precludes the presentation or consideration of detection relationships.

Figure 7:
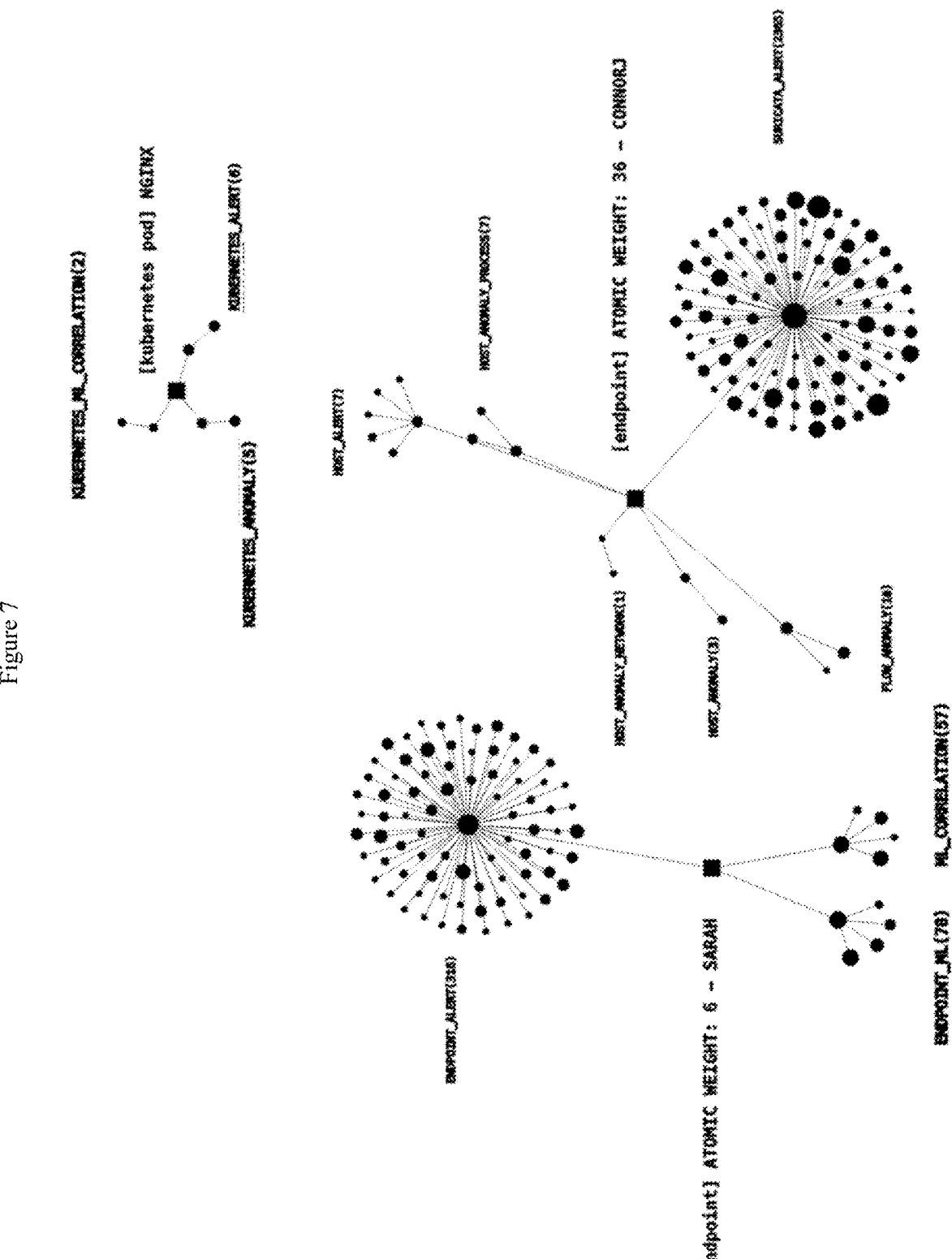
FIG. 7 shows a graph of detection elements with high information gain; This shows an example of how alerts can be better displayed as detection elements with high information gain, according to the invention.

By contrast, FIG. 7 shows how such alerts and relevant detection artifacts can be related and better displayed according to the invention.

FIG. 5 shows an example of a (prior-art) graph of detections by severity with low information gain. This is also unfavorable to a graph display or the identification of signal among noise. Severity is a somewhat static metric that assumes neutral conditions as the alert rule cannot know about the conditions or circumstances it is operating in. Severity is often static, being set when the alert rule is created, and never adjusted for time decay or relevance. Consequently, severity by itself is unrevealing for identifying signal to noise at scale under most conditions. Severity alone is also not the most important attribute when human threat hunters look for complementary sets and relationships which may contain combinations of low, medium and high severity alerts.

These figures illustrate the information gain achieved by the invention. Here the problem is that the simplistic and/or unorganized graphs of large numbers of detections, such as shown in FIGS. 4-5, are hard to read. They essentially have no information gain (e.g., they contribute nothing towards helping to understand the problem) and may take even longer for a human analyst to process, at scale, than the prior-art table presentations where unorganized, individual alerts and detections are presented in a table with a vast number of rows.

In both cases, such interfaces are often designed with little or no real-world user input and consequently enjoy low user success. Even if time and efficiency were not a factor, modern detection sets containing hundreds or even thousands of alerts cannot be presented on-screen at once in an unordered graph or table format in a way that a human analyst can quickly triage and make decisions. The velocity (e.g. speed) of triage and live response in cybersecurity has great value, as any delays in recognizing and responding to intrusions raise the associated cleanup cost and difficulty as threat actors move laterally and spread their access across the target networks and systems.

By contrast, FIG. 6 shows how such alerts and detection artifacts can be better displayed according to the invention. In this diagram, there are three detection elements that have been created and prioritized according to the complementary nature of their relationships. Each of these elements have been given corroborative relationships to reflect the signal confidence present in the set. In the image below, three detection elements are shown: one for an endpoint entity named SARAH on the left; another endpoint named CONNORJ on the right; and a Kubernetes pod named NGINX in the upper right quadrant.

CONNORJ contains six classes of detection artifacts that are a mix of specification-based and machine learning anomaly detections from four disparate data types: endpoint alerts, endpoint anomaly detections, flow log anomaly detections, and IDS alerts. The combination of conventional and machine learning detections, for both process and network events, increases signal probability. The addition of ML detections on the flow logs provides an additional corroboration to the detections formed on the endpoint network events. While this element contains a sizable set of low signal IDS alerts, it is possible to quickly identify the presence of signal among the noise due to the high information gain provided by the relationships in the detection element. This detection element can be formed because the CONNORJ entity construct allows for the joining of four different classes of detection artifacts from four different primary data pipelines.

SARAH has three relationships: endpoint alerts, endpoint ML anomalies, and a perfect corroborative relationship. There is a large set of conventional detections for so-called "dual use" or "living off the land" activity where benign system utilities are utilized, by the adversary, in lieu of conventional malware or persistence mechanisms, in order to muddy the waters and blend in with benign system administration activity. Corroborative combinations of conventional and machine learning detections contribute to signal confidence according to the strength of the corroboration. In this case, the corroboration confidence is boosted by the fact that 57 of the original events in the primary data appear in both sets of detections, 1) the conventional detections and 2) the ML based detections. This corroborative relationship gives the element strong signal and rapid information gain by pre-determining that the activity is not normal or routine administrative activity but is in fact suspicious.

The third detection element, for the Kubernetes pod NGINX, also contains a corroborative relationship between different classes of detection relationships, providing high information gain that the activity being flagged is anomalous and suspicious.

The ability to display detection elements for wholly unlike entities such as endpoints, hosts and pods, is provided by the entity constructs. The entities allow for all available detection elements, involving very different entities and primary data pipelines, to be summarized and stack ranked by signal confidence and priority on a summary page, eliminating the need to visit multiple pages in multiple tools and manually amalgamate this information. This entity-based presentation also allows for an intuitive and digestible presentation of detections for disparate sets of regular hosts and network devices in the same interface, avoiding the delay and confusion involved with the split-brain problem of consuming and managing detection data in two or more sets of tooling and associated user interfaces, a well-recognized anti-pattern. This rapid situational awareness is another form of high information gain which allows security teams to become aware of and respond to the highest priority investigations and incidents with greater velocity, which has significant business value when early containment and damage control efforts are successful.

The detection element presentation also allows for more sophisticated analysis and triage by quickly identifying patterns of interest. The output can be subject to various filters and overlays, such as:

Identifying which entities have high atomic mass because they are prone of high-volume or high-frequency alerts Identifying detection elements that are known to carry high signal probability in a given environment for threat hunting purposes Identifying detection elements where confidence is high due to corroboration between specification-based alerts and machine learning anomaly detections Identifying detection elements with combinations of ATT&CK (a knowledge base and schema for labeling and describing patterns of attacks, see attack.mitre.org/) tactics and/or techniques that are known to have a high signal (e.g., probably or an actual intrusion event). For example, the large cluster in FIG. 7 contains detections associated with execution, persistence, and C2.

Identifying detection elements where extreme risk is extant. For example, entities manifesting hot isotope relationships may need urgent attention, as the probability of successful exploitation, and the potential impact, tends to be high.

This entity-based presentation also allows for an intuitive and digestible presentation of detections for disparate sets of regular hosts and network devices in the same interface, avoiding the delay and confusion involved with the split-brain problem of consuming and managing detection data in two or more sets of tooling and associated user interfaces, a well-recognized anti-pattern. This presentation allows for triage and decision-making from very large sets of detections in real-time, without requiring advanced users or subject matter experts, in less than the time required to read one page of conventional output or presentation.

FIG. 6 also shows detection elements which separate signal from noise using relationships. The detection element for the entity named 'connorj' shows a high information gain method of separating signal from noise. There is a large cluster of network alerts that have been given no priority because 1) all of them are cold isotopes and 2) none of them are in a state of corroboration with the other classes of detection artifacts. At the same time, there are several detection relationships in the element which have higher confidence and signal, as a set, that they do individually. This allows for identification of detection elements with good signal when they contain masses of low signal noise.

FIG. 7 also shows two detection elements where the atomic mass is very large. The element presentation allows for a more careful and accurate analysis of noise vs. signal. While some detection artifacts, such as large numbers of identical behavioral or malware classification detections, may often be sources of noise, detections for C2 or exfiltration may have a normal, frequent, and supernumerary shape. In those cases, imprecise suppression of alert sets based on volume or frequency alone may lead to critical false negatives and long dwell times or large data losses, with a business cost that is orders of magnitude larger than the cost of managing false positives and noise. The element on the left contains a large mass of low signal alerts and has been given no priority. The elements on the right have combinations of detection relationships that provide good signal and confidence and have been up scored accordingly.

Figure 8A:
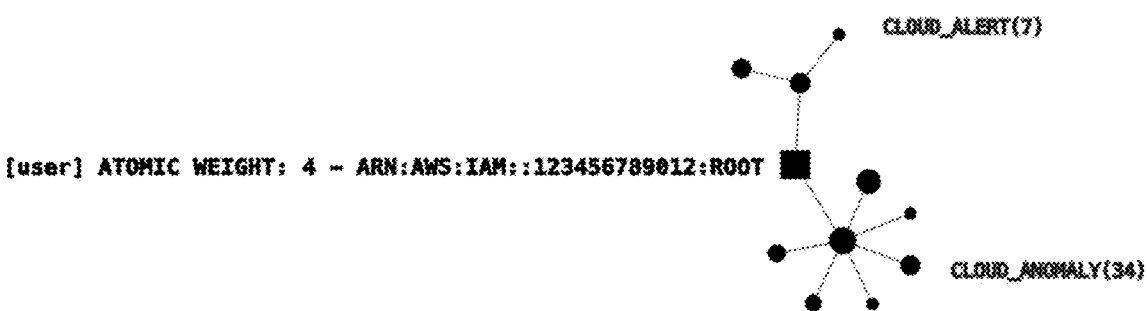
FIG. 8A and FIG. 8B show two different detection elements, which have been given priority due to their atomic weight, for two different cloud user entities.
Figure 8B:
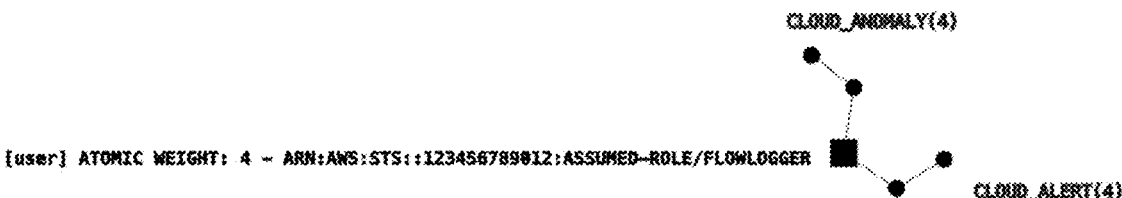

FIG. 8A and FIG. 8B shows signal generation on cloud native threats and detection elements. The combination of conventional and machine learning detections, on the same primary events, gives much higher signal and information gain than either one by itself.

Figure 9:
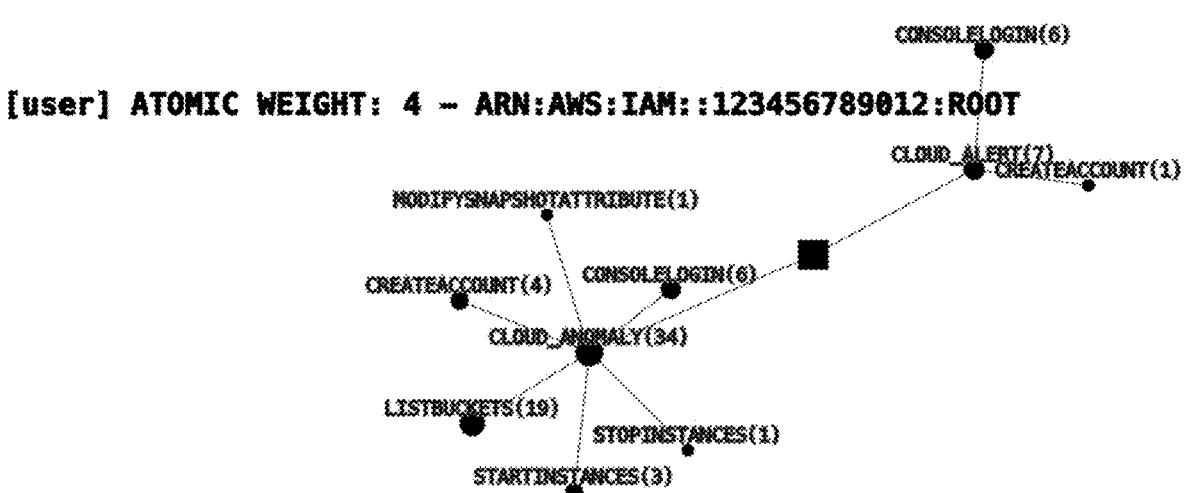
FIG. 9 shows a detail view of a single detection element, for a cloud user entity, and its component parts.

FIG. 9 shows a detail view of a detection element involving credentialed access using a privileged cloud account containing conventional and ML based detections. The use of elements in the cloud native space yields much higher information gain than conventional alerts by pre-computing some of the analysis that would otherwise require a threat hunter. In cases of cloud native credentialed access, simple alerting on API actions is not a feasible detection strategy as API actions are dual-use and suspicious activity differs from benign activity by degrees of nuance. Time-sequence detections, where a set of named actions must be alerted upon in a fixed time window, do not have high signal and produce as many false negatives, as time windows expire, as they produce false positives on benign activity. The formulation of detection elements using all available methods for detecting anomalous high-risk activity has much higher signal and information gain. These elements, again, can be displayed alongside elements for other entities, such as non-cloud entities, in summary pages, by use of the entity constructs.

Figure 10:
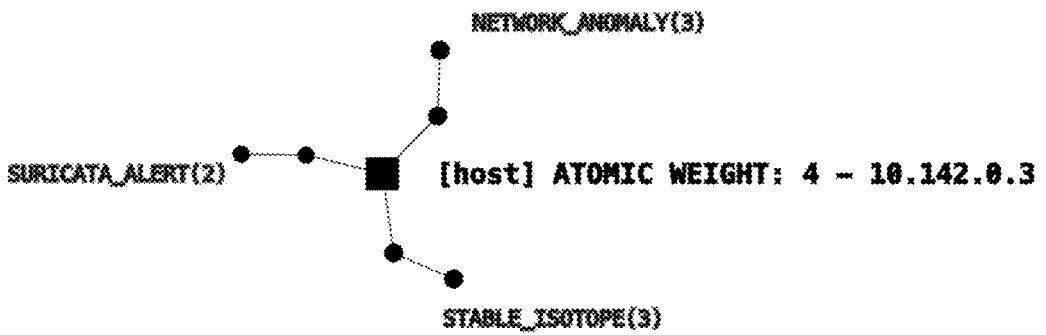
FIG. 10 shows a detection element, for a network host, that has been given priority because it contains three relationships including a stable isotope relationship.

FIG. 10 shows a detection element containing a stable isotope (persistent detection artifact). A stable isotope relationship is injected into detection elements when the conditions evaluate true. This provides for up-scoring and prioritization of these detection elements where both atomic weight (the detection artifact's threat priority) and atomic mass (total number of detection artifacts) may be low enough that they could otherwise be lost in the noise among masses of cold isotopes (aged detection artifacts) or other low signal artifacts. Stable isotopes are threat detections and/or indicators that are not subject to time decay, or have a much slower time decay, because they identify invariant threat activity or because they are not dependent on a particular initial condition such as a CVE.

Figures 11, 12:
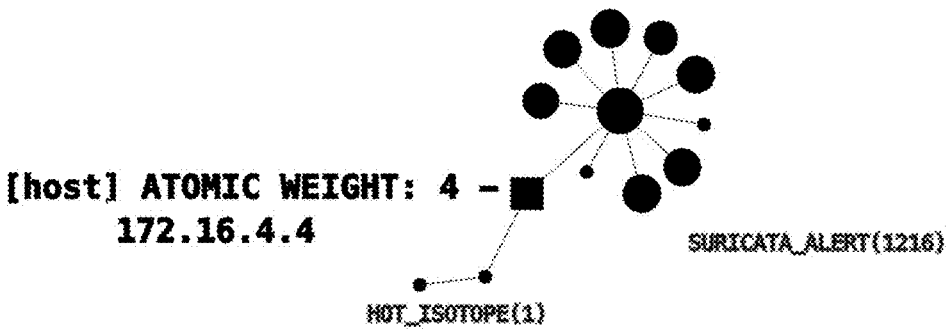
FIG. 11 shows a detail view of this detection element, for a network host, and its component parts, including the stable isotope.
FIG. 12 shows a detection element, for a network host, that has been given priority because it contains a hot isotope.

FIG. 11 shows the detail view of the detection element for a stable isotope (persistent detection artifact). The detail view is rendered when a user drills down on an element in the summary page. The progressive layers of detail keep information gain high on each graph page by presenting the level of detail appropriate to a view. The summary view is used to triage elements and decision them for investigation and relative priority. The detail view provides additional details about the detection relationship in an entity for closer inspection. In this element, there are three detection artifacts, two of which have a strong relationship. The entity, a network device in this case, has been compromised by a web shell, which produced the two detection relationships to the left side of the entity. The stable isotope, on the top, gives the element a priority up score, and the element is given higher signal confidence by the ML anomaly detection on the lower left, which corroborates that the detected suspicious activity bears no resemblance to benign or routine activity.

Note that in some embodiments, the triage criteria comprise consideration of ATT&CK tactics and/or techniques, or comparable labels from another framework, that have been added to detection artifacts containing cloud native logs, the labeling having been performed by a large language model (LLM) that reads the request parameters and assigns the most appropriate label.

FIG. 12 shows a detection element containing a hot isotope. A hot isotope relationship is injected into detection elements when the conditions evaluate true. This provides for up scoring and prioritization of a single detection artifact which is currently relevant and important. In some cases, only a single detection artifact may be generated on certain classes of threat activity, creating a detection element with very low atomic mass and weight which needs to be up scored and prioritized. This will occur as long as the isotope is 'hot'. Hot isotopes have a half-life that decays in a matter of months, typically under a year, and are defined in a continuously updated data dictionary. A detection artifact may be classified as 'hot' because it appears on one or more watchlists, such as the KEV (known exploited vulnerability) lists, or because it is relevant to flash threat intel. Hot isotopes may also be classified by expert human review according to prevailing conditions.

Methods such as watchlists and intel feeds are inherently reactive and not predictive. In order to increase mean-time-to-know (MTTK) on threat activity, predictive analytics are also utilized. A hot isotope may be created by the output of a suitably configured Machine Learning (ML) module (here called the "NOFATE ML module) described in more detail in FIG. 18, which outputs predictions on which isotopes, and which elements, are likely to become important in the future. In some embodiments, this "NOFATE" ML module may further use two other training models in order to make predictions.

A first type of training model trains on curated sets of CVE data, using select fields as features, that have been assembled by experts with extensive security research experience involving vulnerabilities and exploitation. This first trained model labels new CVEs as hot or cold according to how well they resemble hot CVEs in the training data. At the time of this writing, the model is performing well and accurately predicting CVEs which will go critical with up to 27 days early warning. Such early warning has considerable business value because such predictive micro-targeting and early action can result in intrusion prediction, leading to incident avoidance instead of incident response, yielding considerable time and effort savings. These predictions are added to the set of hot isotopes for up scoring detection elements accordingly.

The second model trains on sets of unique detection elements that have been up- or down-voted by users as having high or low relative importance. A model uses training data consisting of detection elements rated high or low in importance and labels new detection elements with a high or low importance label to be used as a factor in the scoring of the detection element.

While these models can be run frequently, producing new and valuable scoring data that can be disseminated to users, the second model tends to take longer than the first to gather training data and output classifications due to the logistical time and effort involved. In order to provide a third early warning system that is simpler and faster, macro trend information may be provided on detection elements by computing which elements are receiving the most attention by means of either: 1) being converted to a case; or 2) receiving upvotes from the users. This trend and recommendation data makes the tool more accessible to general users who are not security experts. Trend information, as a source of intel, can be equally valuable to expert users.

Figure 13:
FIG. 13A detection element with atomic mass, no relationships, no atomic weight. It has low signal and high noise. These elements are not up-scored for priority.

FIG. 13 shows a detection element with atomic mass, no relationships, no atomic weight. It has low signal and high noise. These elements are not up-scored for priority.

Figure 14:
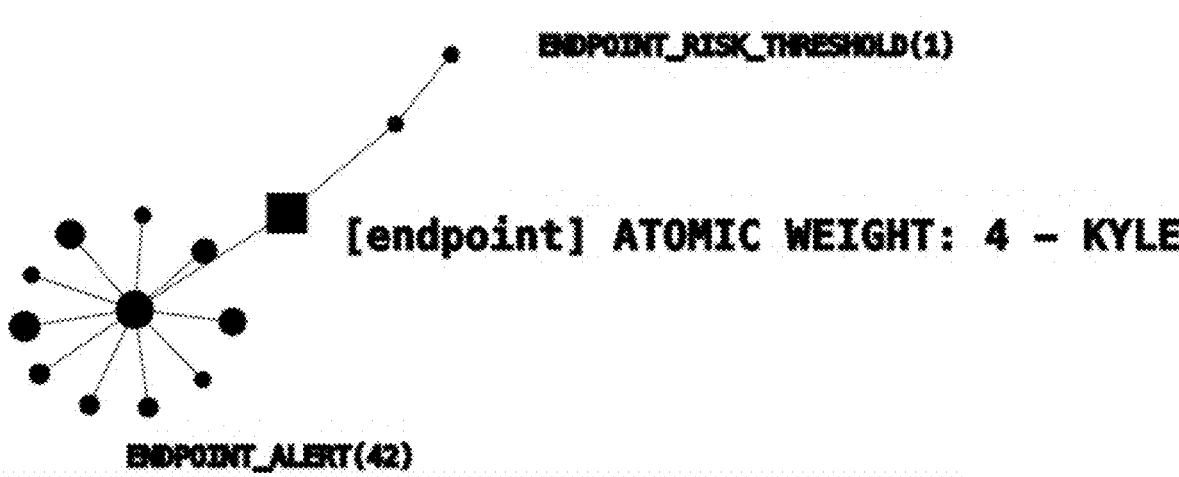
FIG. 14 shows a detection element for an endpoint with a risk threshold relationship.

FIG. 14 shows a detection element for an endpoint with a risk threshold relationship. Risk threshold elements or modifiers indicate that the original set of alerts or detection artifacts meets the criteria for a boost in risk rating.

FIG. 15 shows a "chain reaction" between two detection elements across entity types-pivoting from a compromised endpoint to a cloud account takeover.

This is possible because the entity constructs have more than one dimension. These dimensions can include names, GUIDs, IP addresses, and users. Tools and products that manage different classes of detections-cloud, endpoint, network, user, and so on-often do not detect or surface these kinds of pivoting intrusion cases. When a compromised endpoint is used to pivot to a cloud account, using compromised credentials or trust relationships, this can be a super-critical class of incident. This kind of "chain reaction" between detection elements would tend to be scored highly and given first priority.

FIG. 16 shows a high-level system diagram of the invention. In some embodiments, the invention can be implemented as a web application drawing upon an underlying graph database. It presents the user interface and contains all of the proprietary algorithms, queries, clustering logic, heuristics and machine learning models used by the application. While this data is largely contained in a local data layer, the clusters are drawn using purpose-built queries into an underlying graph database on an application worker node. The graph database has first ingested detection data from one or more detection and/or alert stores. The invention ingests all available detections into the graphing database, including machine learning and/or anomaly detections, where available. In the event that machine learning and/or anomaly detections are not available in the detection repository, This embodiment of the invention provides a set of machine learning notebooks and anomaly detections for use in security products and/or services.

In some embodiments, the invention can be a web application drawing upon an underlying graph database. It presents the user interface and contains all of the proprietary algorithms, queries, scored and stack ranked detection elements and relationships, heuristics, AI enrichments and explainability information, and machine learning inputs used by the application. While this data is largely contained in a local data layer, the detection elements are drawn using purpose-built queries into an underlying graph database comprising the data layer. The graph database has first been populated with views and detection relationships by the processed data loader. These detection relationships are often created by the Recognizer module from one or more detection and/or alert stores. The invention ingests all detection relationships into the graphing database, including machine learning and/or anomaly detections, where available. This is described in more detail below.

Figure 17A:
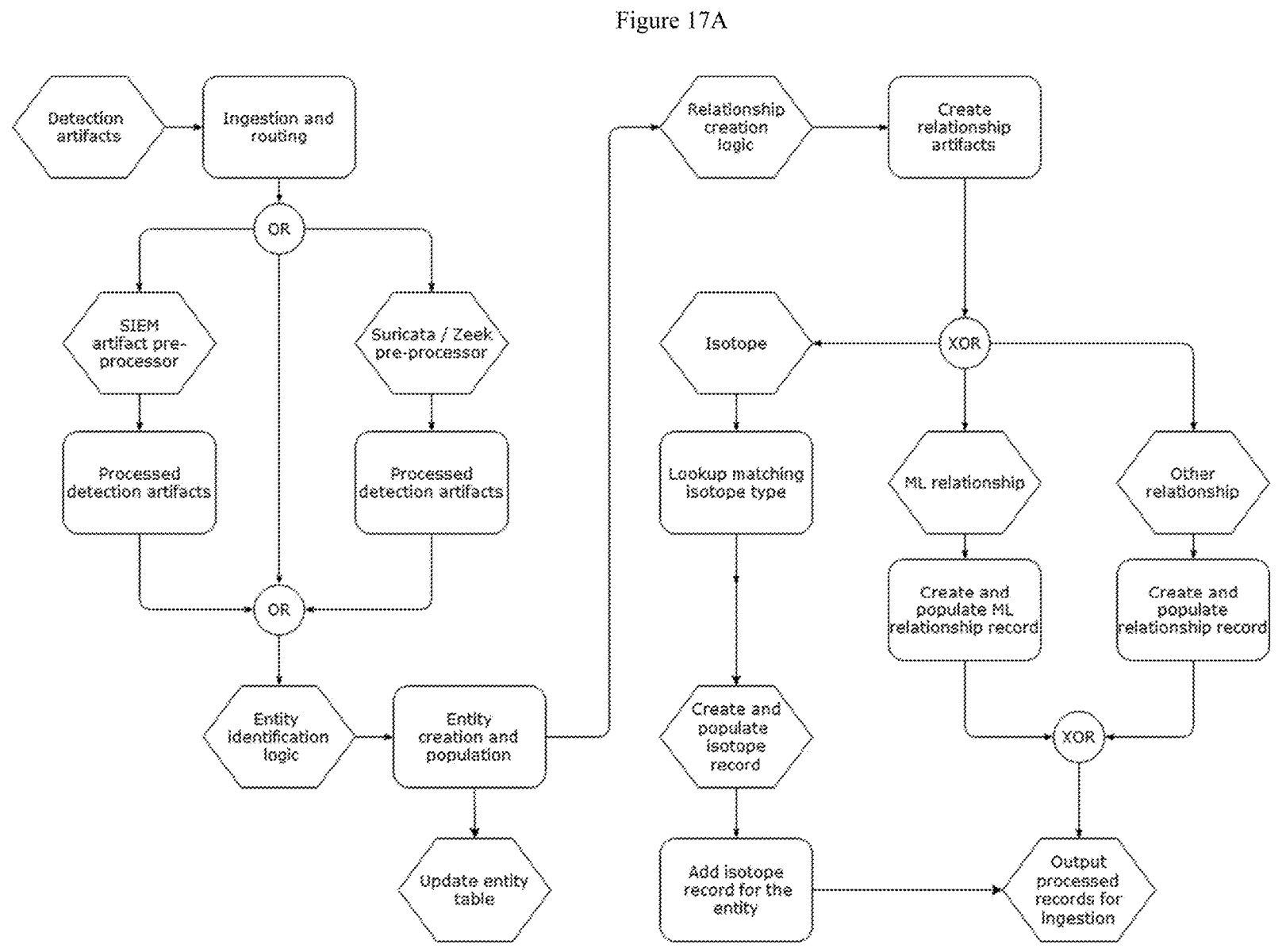

FIG. 17A shows the internal logic of the Recognizer software module. Detection artifacts are ingested from primary data sources such as SIEM (Security Information and Event Management), EDR (Endpoint Detection and Response) and/or IDS (Intrusion Detection System) tools. These may include any of methods comprising any number and type of threat detection artifacts generated from any of EDR and/or endpoint data; network data; cloud API logs or Kubernetes logs. Detection artifacts from any of these original data sources comprise at least any of:

a) Specification-based detections created via rules and/or queries run on network flow or PCAP (network packet capture) data;

b) Anomaly detections created by machine learning jobs using any data type including, but not limited to, cloud, host and network data;

c) Anomaly detections created by statistical analysis using any data type including, but not limited to, cloud, host and network data;

d) Anomaly detections created by entity-relationship anomaly detection using any data type including, but not limited to, cloud, host and network data;

e) Malware detections, from an antivirus engine or a machine learning model;

f) Correlated signals comprising a match between a CVE (common vulnerabilities and exposure), and a payload observed on a target;

g) Correlated signals comprising at least one threat detection for a high-value target based on critical server roles;

h) Threat intelligence-based indicators and enrichment;

i) detection artifacts from a large language model (LLM)

The detection artifacts are processed by the module appropriate to the primary data source and processed into detection relationships with entity names and types which are tracked in an entity database. The entity database, and the metadata it contains, allows for alerts and detection artifacts from different primary data sources to be related coherently. For example, many network detections may have IP address information and no hostnames. By looking up an entity's IP address and resolving it to an endpoint entity, where it is an endpoint entity, network detection relationships can be added to detection elements for an endpoint, a capability that is lacking in many security tools today. The ability to form such detection elements from disparate data types eliminates the need to do manual correlation between different tools and primary data types which is slow and infeasible at scale.

Next, the Recognizer creates additional detection relationships to represent any complementary or corroborative patterns among the detection relationships that are essential to risk scoring and prioritization. These can be any of isotopes (hot, cold or stable); ML relationships providing signal confidence; and other relationships that increase confidence in the signal and priority of the detection element. These relationships are output in the form of detection relationships and added to the detection relationships formed from the processed detection artifacts. All of these detection relationships are provided to the data loader in the form of Json or CSV files.

Figure 17B:
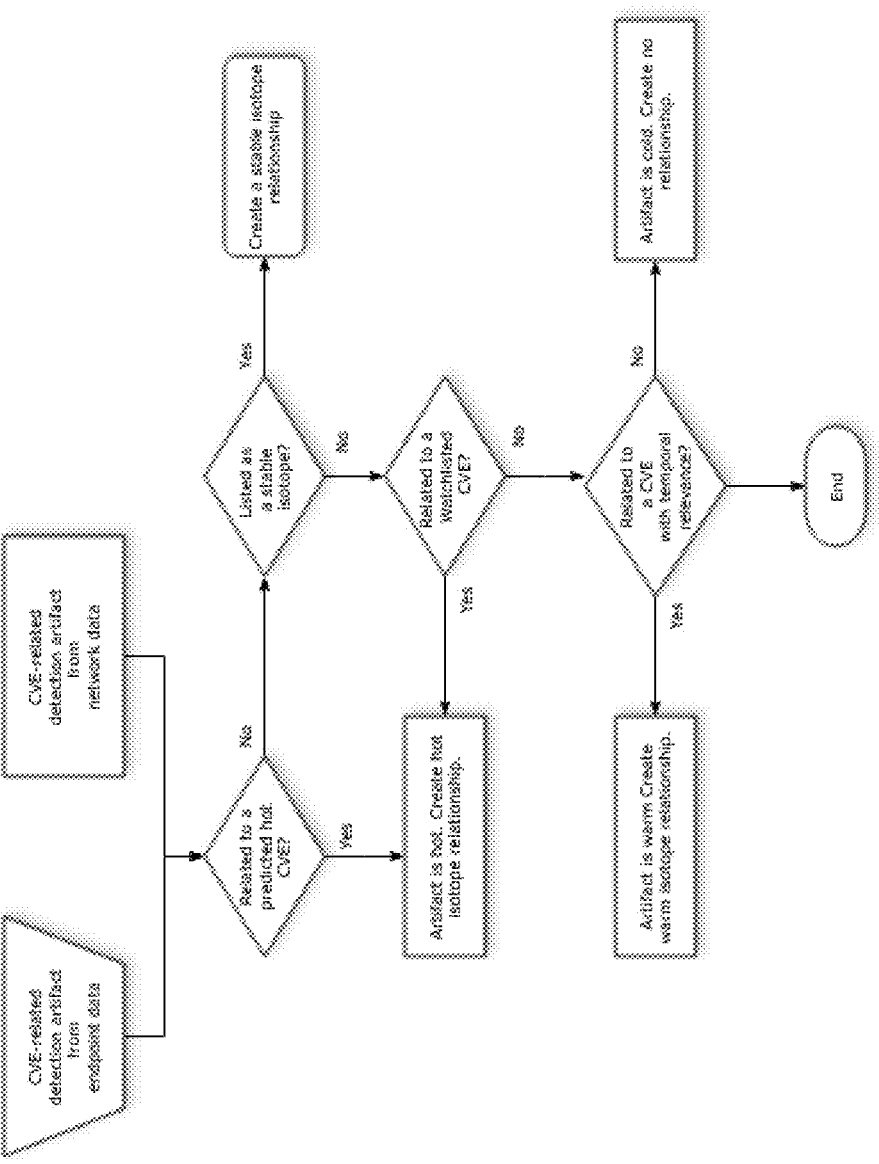
FIG. 17B shows a flowchart of how hot, cold and warm isotope relationships are processed.

FIG. 17B shows a flowchart of how hot, cold and warm isotope relationships are processed.

FIG. 18 shows a high-level system diagram of the invention's 'Nofate' module. The Nofate module generates predictions, classifications and recommendations for adding to, and up scoring, detection elements. There are four main pipelines that produce relationships or modifiers.

A CVE (Common Vulnerabilities and Exposures) prediction model is used to predict which CVEs are likely to be added to one or more watchlists such as the KEVs (known exploitation watchlists) that are generally available. To do this, a carefully curated set of training data that categorizes detection events as to if they are "hot" (newly identified as a potential threat), or "cold," previously identified long enough ago, and without further data supporting a threat categorization, to thus be considered of less importance) can be used for AI model training. The "hot" labeled data can comprise of existing lists of CVEs that have experienced significant exploitation and/or importance. The cold labeled data consists of a roughly equivalent number of CVEs, curated and hand selected by experts with extensive subject matter knowledge, that are of lower significance in terms of impact and/or importance. The trained model is used to make hot/cold predictions on new CVEs as soon as possible so that they can be added to data dictionaries and cause the creation of hot isotopes.

The element prediction model trains, where it has been enabled, on historical sets of detection elements that have been given hot/cold sentiment ratings by users. A rating of hot indicates importance and a rating of cold is the converse. This model allows for model learning to inform recommendations to users that are tailored to local conditions. It also provides for such recommendations if and when the product instance is running in a disconnected enclave where trend data is not readily available.

The recommendation engine provides for a simple and rapid prioritization input when prediction data is not yet available or when human sentiment analysis provides more information gain because an emerging threat pattern is not yet included in the training data. The recommendation engine, where enabled, measures macro trends in user sentiment towards detection elements and/or artifacts in order to surface "herd wisdom" about which threat patterns are receiving the most positive sentiment, which is reflective of prioritization and importance. Human-produced expert analysis and/or threat intel may also be added to these recommendations at times.

Figure 19:
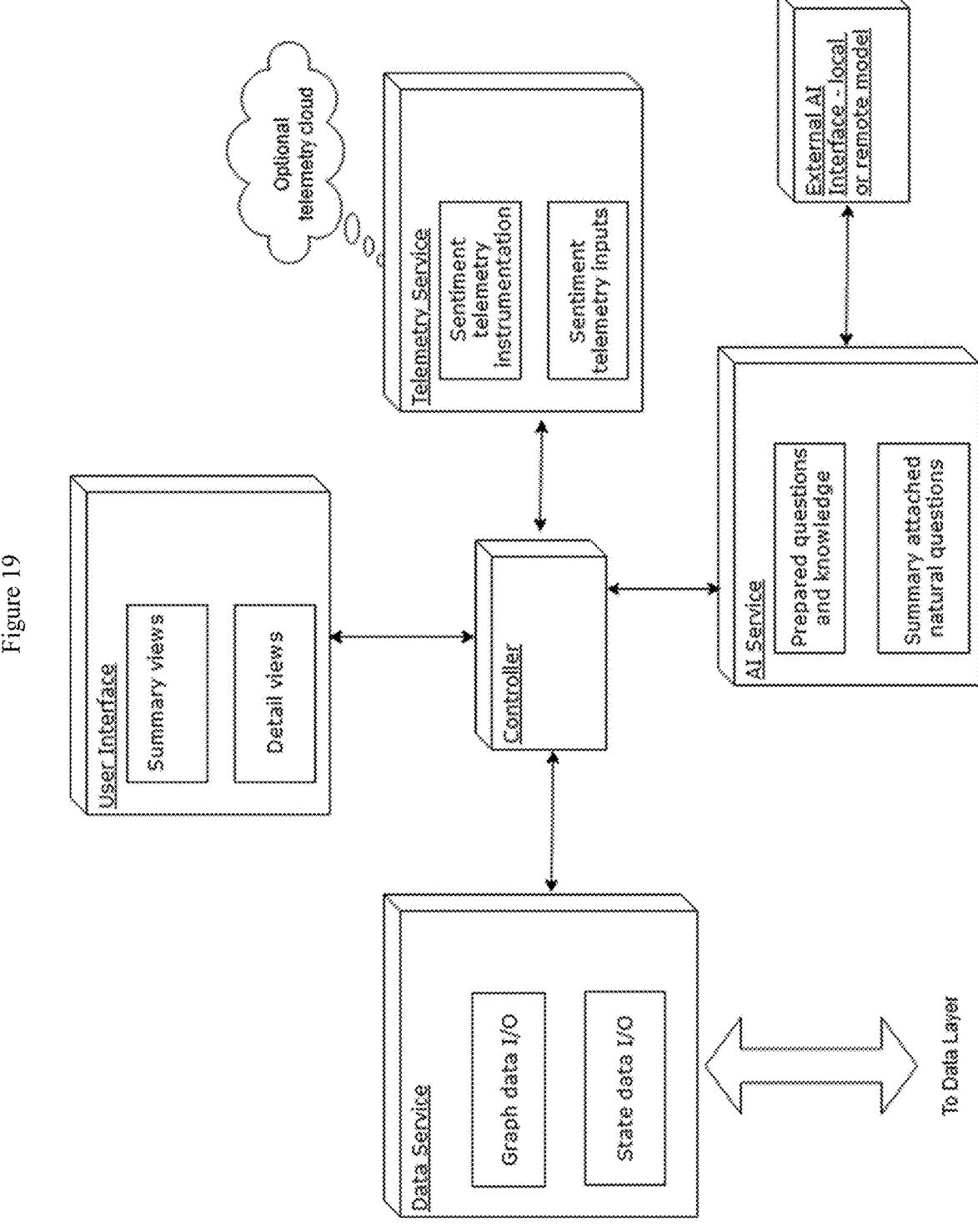
FIG. 19 shows a high-level diagram for a web application front end that can be used to provide the invention's user interface

FIG. 19 shows a high-level diagram for the web application frontend that, in some embodiments, can be used to provide the user interface. The application is a set of modules that provide key functions for presenting the user interface and have the ability to communicate with one another when needed. The main modules are the user interface, data service, telemetry service, and the user interface.

The controller portion of the application works between the user interface and the services in the backend of the application. Depending on the workflow the user is trying to get to, the controller portion will direct which service to communicate with.

The data service part of the backend is responsible for retrieving data required by the user interface modules. Detection elements and relationships are retrieved from the graph database and certain state data is persisted in a SQL data structure. This state data includes entity attributes that have been learned by the recognizer; user sentiment measurements on detection elements; and cases and case state data, when an element is promoted to a case for investigation. Custom relationships, detection elements, and scoring logic are also persisted in the SQL data structure when users have created them.

In order to maximize information gain and decisioning at scale, the web user interface service provides a progression from summary to detailed views in order to avoid the common usability issues of graph interfaces which display with more detail than is usable in a given view. The top-level summary displays stack-ranked detection elements that have been prioritized using metrics such as atomic weight, allowing a user to quickly know how large and/or extensive their current threat condition is. The second level displays more detail of a detection element for a selected entity, allowing for rapid decisioning and prioritization. The third level provides full details of the detection elements for an entity with search and filtering elements, providing for investigation of detection elements and the compromised entities they contain. These views are presented in both graph and table format in the visual and tactical pages respectively. Several additional elements are presented in the graph based visual section that are better suited to a pictorial format including interconnected detection elements, user entities related to other entities, and anomalous entity relationships.

The telemetry service processes inbound and outbound telemetry. Inbound telemetry provides for global macro trend data reflecting user sentiment on which detection elements and/or relationships are currently being given priority sentiment. Outbound telemetry transmits anonymized statistical data for aggregation and transformation into this macro trending data. The macro trend data provides a simple and rapid feed of judgements, made by human users, as to what kinds of threat patterns currently have high importance or relevance sentiment.

The AI service is a backend module responsible for communicating with LLMs and populating a model with the knowledge needed to answer questions about detection elements and relationships.

The AI Service provider is responsible for the interaction between the data sent to it and the response made by the LLM and returns it back to the controller which would then return it back to the user interface. This service has the ability to select which kind of LLMs should be used based on the user's preferences, which may be set in the user interface. This service will also instantiate AI agents and tell the agent what information to look for and how to process it. The AI service handles questions and answers for users working in the user interface, where questions may be asked about the detection elements, relationships, entities, data types, or detection artifacts for explainability. By providing a model of detailed knowledge of the unique detection elements and relationships in the tool, and their significance to risk assessment and prioritization, and investigative routes, the tool can be used by a non-expert user by utilizing the AI interface for explanations. An advantage of these inputs is that detection elements, being summarized and distilled into a form that is more like analysis or intelligence than raw data, are of such size that they can be included as a system prompt attached to a question to an AI interface with token consumption small enough they can be included in a natural language question input by a user.

Without using these detection elements in this way, it would be necessary to send all of the alerts and detection artifacts to the AI model, which would require vectorizing them first, due to the token counts required, and probably sending them through a Retrieval-Augmented Generation (RAG) implementation. While this is sometimes done, the models do not excel at discerning and identifying the key relationships among sets of detection elements when processing large bulk data such as alerts in this way. The pre-computing of the detection relationships and elements enables better answers from an LLM model at greater efficiency.

TensorFlow® is a trademark of Google Inc.

The invention claimed is:

1. A method of analyzing threat detection artifacts, said method comprising:

using at least one processor to create entity-based clusters of potential threat detection artifacts from any of host, network, cloud API log data, or other sources, and forming clusters of said threat detection artifacts by using at least one join algorithm to join said threat detection artifacts according to any of endpoint detection artifact source or network detection artifact source without use of time windows;

said at least one processor configured so that when said threat detection artifacts are from any host data, said threat detection artifacts are handled as endpoint sourced type threat detection artifacts using a primary join key comprising a host Global Unique Identifier (GUID), and at least one secondary join key(s) comprising a hostname and identified source or identified destination IP address;

said at least one processor further configured so that when threat detection artifacts are obtained from network data, and no host entity can be determined, then said threat detection artifacts comprise a primary key comprising a device IP address and a secondary join key comprising a destination IP address;

said at least one processor further configured so that when threat detection artifacts are obtained from cloud API log data, then treat these threat detection artifacts as comprising a primary key comprising a unique user context;

said at least one processor further configured so that when said threat detection artifacts involve a Kubernetes cluster, then said threat detection artifacts are handled using a primary join key comprising a cluster identifier;

using said at least one processor to score said clusters according to their threat potential, thus producing scored clusters;

using said at least one processor to filter said scored clusters according to a triage criteria, producing triage-scored clusters;

using said at least one processor to analyze at least those said triage-scored clusters with their secondary join keys spatially distributed around their primary join keys;

and using said at least one processor to output at least some of said triage-scored clusters along with at least some of their secondary join keys and at least some of their primary join keys.

2. The method of claim 1, wherein:

said at least one processor configured so that when said threat detection artifact comprises a cloud detection artifact from any of a virtual machine or compute workload, then:

further clustering potential threat detection artifacts from said cloud API log data by determining at least one cluster comprising a primary join key comprising a user context.

3. The method of claim 1, wherein said potential threat detection artifacts are determined by methods comprising any number and type of threat detection artifacts, including at least any of:

a) specification-based detections created via rules and/or queries run on network flow or PCAP (network packet capture) data;

b) anomaly detections created by machine learning jobs comprising network data and any of cloud and host data;

c) anomaly detections created by statistical analysis using any data type including, but not limited to, network data and any of cloud and host data;

d) anomaly detections created by entity-relationship anomaly detection using any data type including, but not limited to, network data and any of cloud and host data;

e) malware detections, from an antivirus engine or a machine learning model;

f) correlated signals comprising a match between a CVE (Common Vulnerabilities and Exposure) database and a payload observed on a target;

g) correlated signals comprising at least one threat detection for a high-value target based on critical server roles;

h) Threat intelligence-based indicators and enrichment;

i) detection artifacts from a large language model (LLM).

4. The method of claim 3, wherein said anomaly detections created by machine learning jobs comprising network data and any of cloud and host data are made by any of a Common Vulnerabilities and Exposures (CVE) prediction model based on a curated set of training data, an element prediction module based on historical sets of previously rated detection elements, and a recommendation engine.

5. The method of claim 1, wherein said scoring is analyzed according to any of determining:

a) clusters comprising certain combinations of detection types are scored higher;

b) clusters comprising detection artifacts with interrelated tactic and/or technique metadata;

c) clusters with a conjunction of a Common Vulnerabilities and Exposure) (CVE)-specific payload, in a threat detection artifact, and a presence of a relevant CVE on a target host or device;

d) clusters with intrusion sources previously categorized by machine learning as potentially higher risk are scored higher;

e) clusters that contain sets of one more detection artifacts that have been marked for attention by any of a recommendation engine and a machine learning model for providing user-relevant recommendations as to priority and urgency of threat detection clusters;

f) clusters where confidence is high due to corroboration between specification-based alerts and machine learning anomaly detections.

6. The method of claim 1, wherein said triage criteria comprise any of:

a) The nature and quantity of detection artifacts;

b) the nature of the entity the cluster has formed around;

c) the size and shape of the cluster;

e) value or sensitivity of the entity at the nucleus of the cluster.

7. The method of claim 1, wherein said triage criteria comprise any of:

a) quantity or frequency of intrusion event;

b) intrusion event found in public or private adversary tactic and technique databases;

c) known vulnerability of that cluster's cluster host/device;

d) value or sensitivity of that cluster's host/device.

8. The method of claim 1, wherein graphing said, further comprises labeling or altering a graphical appearance of said primary join keys or secondary join keys.

9. The method of claim 1, wherein said cluster identifier is either parsed from said artifacts or derived and assigned using a lookup table.

10. The method of claim 1, where any of said triage criteria and detection artifacts further comprise ATT&CK information.

11. The method of claim 1, wherein said method further graphically displays clusters of threat detection artifacts, and wherein said method further uses at least one computer processor to graphically display said triage-scored clusters with their secondary join keys spatially distributed around their primary join keys.

12. The method of claim 1, further using an AI model configured to use said triage-scored clusters with their secondary join keys spatially distributed around their primary join keys to automatically identify at least some high-signal threat detection artifacts.

13. The method of claim 1, wherein said scoring is analyzed according by further determining at least:

clusters with a conjunction of a Common Vulnerabilities and Exposure) (CVE)-specific payload, in a threat detection artifact, and a presence of a relevant CVE on a target host or device, by further determining said cluster's dynamically prioritized detection artifact (isotope), determining an isotope classification of said isotope, assigning said isotope classification to said CVE, and using at least said isotope classification assigned to said CVE.

14. The method of claim 1, wherein said triage criteria further comprise at least the nature and quantity of a signal strength of relationships between said detection artifacts; wherein said signal strength of relationships is determined by computing a first score comprising a total number of detection artifacts and a second score comprising at least one of a signal strength and threat priority of said detection artifacts.

15. The method of claim 1, wherein said triage criteria further comprise at least a known vulnerability of that cluster's cluster host/device by further determining said cluster's dynamically prioritized detection artifact (isotope), determining an isotope classification of said isotope, assigning said isotope classification to said vulnerability, and using at least said vulnerability and said isotope classification for at least some of said triage criteria.

16. A method of graphically displaying clusters of threat detection artifacts, said method comprising:

using at least one processor to create entity-based clusters of potential threat detection artifacts from any of host, network, cloud API log data, or other sources, and forming clusters of said threat detection artifacts by using at least one join algorithm to join said threat detection artifacts according to any of endpoint detection artifact source or network detection artifact source without use of time windows;

said at least one processor configured so that when said threat detection artifacts are from any host data, said threat detection artifacts are handled as endpoint sourced type threat detection artifacts using a primary join key comprising a host Global Unique Identifier (GUID), and at least one secondary join key(s) comprising a hostname and identified source or identified destination IP address;

said at least one processor configured so that when threat detection artifacts are obtained from network data, and no host entity can be determined, then said threat detection artifacts comprise a primary key comprising a device IP address and a secondary join key comprising a destination IP address;

said at least one processor configured so that when threat detection artifacts are obtained from cloud API log data, then treat these threat detection artifacts as comprising a primary key comprising a unique user context;

said at least one processor configured so that when said threat detection artifacts involve a Kubernetes cluster, then said threat detection artifacts are handled using a primary join key comprising a cluster identifier;

scoring said clusters according to their threat potential, thus producing scored clusters;

filtering said scored clusters according to a triage criteria, producing triage-scored clusters;

using at least one computer processor to graphically display said triage-scored clusters with their secondary join keys spatially distributed around their primary join keys;

wherein said anomaly detections are created by machine learning jobs comprising any of cloud, host, and network data; and wherein said anomaly detections created by machine learning jobs comprising any of cloud, host, and network data are made by any of a Common Vulnerabilities and Exposures (CVE) prediction model based on a curated set of training data, an element prediction module based on historical sets of previously rated detection elements, and a recommendation engine.

17. The method of claim 16, further using an AI model configured to use said triage-scored clusters with their secondary join keys spatially distributed around their primary join keys to automatically identify at least some high-signal threat detection artifacts.

18. A method of analyzing threat detection artifacts, said method comprising:

using at least one processor to create entity-based clusters of potential threat detection artifacts from any of host, network, cloud API log data, or other sources, and forming clusters of said threat detection artifacts by using at least one join algorithm to join said threat detection artifacts according to any of endpoint detection artifact source or network detection artifact source;

said at least one processor configured so that when said threat detection artifacts are from any host data, said threat detection artifacts are handled as endpoint sourced type threat detection artifacts using a primary join key comprising a host Global Unique Identifier (GUID), and at least one secondary join key(s) comprising a hostname and identified source or identified destination IP address;

said at least one processor further configured so that when threat detection artifacts are obtained from network data, and no host entity can be determined, then said threat detection artifacts comprise a primary key comprising a device IP address and a secondary join key comprising a destination IP address;

said at least one processor further configured so that when threat detection artifacts are obtained from cloud API log data, then treat these threat detection artifacts as comprising a primary key comprising a unique user context;

said at least one processor further configured so that when said threat detection artifacts involve a Kubernetes cluster, then said threat detection artifacts are handled using a primary join key comprising a cluster identifier;

using said at least one processor to score said clusters according to their threat potential, thus producing scored clusters;

using said at least one processor to filter said scored clusters according to a triage criteria, producing triage-scored clusters;

using said at least one processor to analyze at least those said triage-scored clusters with their secondary join keys spatially distributed around their primary join keys;

using said at least one processor to output at least some of said triage-scored clusters along with at least some of their secondary join keys and at least some of their primary join keys;

and further performing any of:

i) analyzing said scoring by further determining at least: clusters with a conjunction of a Common Vulnerabilities and Exposure) (CVE)-specific payload, in a threat detection artifact, and a presence of a relevant CVE on a target host or device, by further determining said cluster's dynamically prioritized detection artifact (isotope), determining an isotope classification of said isotope, assigning said isotope classification to said CVE, and using at least said isotope classification assigned to said CVE;

ii) using triage criteria that further comprise at least the nature and quantity of a signal strength of relationships between said detection artifacts; wherein said signal strength of relationships is determined by computing a first score comprising a total number of detection artifacts and a second score comprising at least one of a signal strength and threat priority of said detection artifacts;

iii) using triage criteria that further comprise at least a known vulnerability of that cluster's cluster host/device by further determining said cluster's dynamically prioritized detection artifact (isotope), determining an isotope classification of said isotope, assigning said isotope classification to said vulnerability, and using at least said vulnerability and said isotope classification for at least some of said triage criteria.

* * * * *